US012219581B2

(12) United States Patent
Ahn et al.

(10) Patent No.: US 12,219,581 B2
(45) Date of Patent: Feb. 4, 2025

(54) WIRELESS COMMUNICATION METHOD FOR SIMULTANEOUS DATA TRANSMISSION AND RECEPTION AND WIRELESS COMMUNICATION APPARATUS USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Yongho Kim, Gyeonggi-do (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 18/381,161

(22) Filed: Oct. 17, 2023

(65) Prior Publication Data
US 2024/0064778 A1 Feb. 22, 2024

Related U.S. Application Data

(63) Continuation of application No. 17/752,863, filed on May 25, 2022, now Pat. No. 11,832,280, which is a
(Continued)

(30) Foreign Application Priority Data

May 26, 2014 (KR) .................. 10-2014-0063358
May 26, 2014 (KR) .................. 10-2014-0063361
Jun. 20, 2014 (KR) .................. 10-2014-0076102

(51) Int. Cl.
H04W 72/30 (2023.01)
H04L 47/2416 (2022.01)
(Continued)

(52) U.S. Cl.
CPC ......... *H04W 72/30* (2023.01); *H04L 47/2416* (2013.01); *H04L 47/2433* (2013.01);
(Continued)

(58) Field of Classification Search
CPC ... H04W 72/02; H04W 72/52; H04W 12/189; H04M 3/56
See application file for complete search history.

(56) References Cited

U.S. PATENT DOCUMENTS 7,664,132 B2  2/2010  Benveniste
10,506,553 B2  12/2019  Ahn et al.
(Continued)

FOREIGN PATENT DOCUMENTS

CN  1784862    6/2006
CN  102550116   7/2012
(Continued)

OTHER PUBLICATIONS

International Preliminary Report on Patentability (Chapter I) for PCT/KR2015/005264 issued on Nov. 29, 2016 and its English translation from WIPO.
(Continued)

*Primary Examiner* — Raj Jain
(74) *Attorney, Agent, or Firm* — WOMBLE BOND DICKINSON (US) LLP

(57) ABSTRACT

The present invention relates to a wireless communication method for simultaneous transmit and receive of data and a wireless communication terminal using the same, and more particularly, to a wireless communication method and an apparatus thereof which can efficiently perform simultane-
(Continued)

ous data transmission and reception even in an overlapped BSS environment.

To this end, provided are a wireless communication method of a terminal, including: performing a backoff procedure for transmitting data; transmitting a first RTS frame when a backoff counter of the backoff procedure is expired; setting a transmission timer for waiting for transmitting the data when a second RTS frame is received in response to the transmitted first RTS frame; and waiting for transmitting the data based on the set transmission timer and a wireless communication terminal using the same.

10 Claims, 19 Drawing Sheets

Related U.S. Application Data continuation of application No. 16/672,532, filed on Nov. 4, 2019, now Pat. No. 11,382,067, which is a continuation of application No. 15/313,104, filed as application No. PCT/KR2015/005264 on May 26, 2015, now Pat. No. 10,506,553.

(51) Int. Cl.
| | | |
|---|---|---|
| H04L 47/2425 | (2022.01) | |
| H04M 3/56 | (2006.01) | |
| H04W 72/02 | (2009.01) | |
| H04W 72/04 | (2023.01) | |
| H04W 72/52 | (2023.01) | |
| H04W 74/0816 | (2024.01) | |
| H04W 74/0833 | (2024.01) | |
| H04W 84/12 | (2009.01) | |

(52) U.S. Cl.
CPC ............ *H04M 3/56* (2013.01); *H04W 72/02* (2013.01); *H04W 72/04* (2013.01); *H04W 72/52* (2023.01); *H04W 74/0816* (2013.01); *H04W 74/0833* (2013.01); *H04W 84/12* (2013.01)

(56) References Cited

U.S. PATENT DOCUMENTS

| | | | |
|---|---|---|---|
| 11,382,067 | B2 | 7/2022 | Ahn et al. |
| 2003/0123405 | A1 | 7/2003 | del Prado et al. |
| 2005/0124294 | A1* | 6/2005 | Wentink ............ H04W 72/1263 455/41.2 |
| 2006/0120339 | A1 | 6/2006 | Akiyama et al. |
| 2011/0235596 | A1 | 9/2011 | Wentink |
| 2011/0243025 | A1 | 10/2011 | Kim et al. |
| 2011/0268054 | A1 | 11/2011 | Abraham et al. |
| 2012/0236840 | A1 | 9/2012 | Kim et al. |
| 2013/0195081 | A1 | 8/2013 | Merlin et al. |
| 2013/0208708 | A1 | 8/2013 | Nezou et al. |
| 2013/0223382 | A1 | 8/2013 | Abraham et al. |
| 2013/0301569 | A1 | 11/2013 | Wang et al. |
| 2014/0010145 | A1 | 1/2014 | Liu et al. |
| 2014/0126442 | A1 | 5/2014 | Jafarian et al. |
| 2014/0161010 | A1* | 6/2014 | Merlin ............... H04W 52/0235 370/311 |
| 2014/0269628 | A1* | 9/2014 | Ghosh .................. H04W 74/04 370/336 |
| 2015/0063111 | A1* | 3/2015 | Merlin .................... H04W 8/04 370/235 |
| 2015/0124681 | A1* | 5/2015 | Zhou ...................... H04M 3/567 370/312 |
| 2015/0264578 | A1* | 9/2015 | Chaves ............. H04W 74/0816 370/338 |
| 2017/0195991 | A1 | 7/2017 | Ahn et al. |
| 2017/0202026 | A1 | 7/2017 | Ahn et al. |
| 2020/0068530 | A1 | 2/2020 | Ahn et al. |
| 2022/0295448 | A1 | 9/2022 | Ahn et al. |
| 2024/0064778 | A1* | 2/2024 | Ahn ..................... H04L 47/2433 |

FOREIGN PATENT DOCUMENTS

| | | |
|---|---|---|
| CN | 102771060 | 11/2012 |
| CN | 102792757 | 11/2012 |
| CN | 102812649 | 12/2012 |
| CN | 103260249 | 8/2013 |
| CN | 103298081 | 9/2013 |
| JP | 2004-364121 | 12/2004 |
| JP | 2013-526153 | 6/2013 |
| KR | 10-2009-0089420 | 8/2009 |
| KR | 10-2010-0119086 | 11/2010 |
| KR | 10-2011-0095098 | 8/2011 |
| KR | 10-2012-0090072 | 8/2012 |
| KR | 10-2013-0045818 | 5/2013 |
| KR | 10-2013-0121096 | 11/2013 |
| WO | 2007/074452 | 7/2007 |
| WO | 2011/099791 | 8/2011 |
| WO | 2013/168105 | 11/2013 |
| WO | 2014/061992 | 4/2014 |

OTHER PUBLICATIONS

International Search Report for PCT/KR2015/005264 mailed on Sep. 15, 2015 and its English translation from WIPO.
Written Opinion of the International Searching Authority for PCT/KR2015/005264 mailed on Sep. 15, 2015 and its English translation from WIPO.
Office Action dated Mar. 5, 2019 for Chinese Application No. 201580027163.1 and its English translation provided by Applicant's foreign council.
Notice of Allowance dated Jul. 29, 2019 for U.S. Appl. No. 15/313,104 (now published as US 2017/0195991).
Advisory Action dated Dec. 26, 2018 for U.S. Appl. No. 15/313,104 (now published as US 2017/0195991).
Final Office Action dated Sep. 4, 2018 for U.S. Appl. No. 15/313,104 (now published as US 2017/0195991).
Non-Final Office Action dated Apr. 12, 2018 for U.S. Appl. No. 15/313,104 (now published as US 2017/0195991).
Notice of Allowance dated May 13, 2022 for Korean Patent Application No. 10-2021-7004132 and its English translation provided by Applicant's foreign counsel.
Office Action dated Jun. 30, 2020 for Korean Patent Application No. 10-2020-7010659 and its English translation provided by Applicant's foreign counsel.
Office Action dated Jun. 30, 2020 for Korean Patent Application No. 10-2020-7010661 and its English translation provided by Applicant's foreign counsel.
Notice of Allowance dated Jan. 13, 2020 for Korean Patent Application No. 10-2016-7031978 and its English translation provided by Applicant's foreign counsel.
Notice of Allowance dated Nov. 9, 2020 for Korean Patent Application No. 10-2020-7010659 and its English translation provided by Applicant's foreign counsel.
Notice of Allowance dated Nov. 4, 2020 for Korean Patent Application No. 10-2020-7010661 and its English translation provided by Applicant's foreign counsel.
Office Action dated Mar. 18, 2021 for Korean Patent Application No. 10-2021-7004132 and its English translation provided by Applicant's foreign counsel.
Office Action dated Dec. 13, 2021 for Korean Patent Application No. 10-2021-7004132 and its English translation provided by Applicant's foreign counsel.
Notice of Allowance dated Feb. 22, 2022 for U.S. Appl. No. 16/672,532 (now published as US 2020/0068530).
Advisory Action dated Nov. 15, 2021 for U.S. Appl. No. 16/672,532 (now published as US 2020/0068530).
Final Office Action dated Jul. 26, 2021 for U.S. Appl. No. 16/672,532 (now published as US 2020/0068530).
Office Action dated Mar. 9, 2021 for U.S. Appl. No. 16/672,532 (now published as US 2020/0068530).

(56) References Cited

OTHER PUBLICATIONS

Notice of Allowance dated Jan. 11, 2023 for Chinese Patent Application No. 201911258803.6 and its English translation provided by Applicant's foreign counsel.
CCL/ITRI: "MAC Procedures for CPCH", TSG RAN 1#7, TSG R1#7(99)B03, Hannover, Germany, Aug. 30-Sep. 3, 1999, pp. 1-13.
NTT DoCoMo: "CR on UMTS particular 23.146 based on GSM 03.46", 20 3GPP TSG-N meeting #6, NP-99428, (pd <= May 26, 2014) and (trigger frame) and (basic service set or bss) and (confirmation frame), Nice, France, Dec. 13-15, 1999, pp. 1-79.
Notice of Allowance dated Feb. 24, 2023 for Chinese Patent Application No. 201911258782.8 and its English translation provided by Applicant's foreign counsel.
Office Action dated Sep. 28, 2022 for Chinese Patent Application No. 201911258782.8 and its English translation provided by Applicant's foreign counsel.
Bao et al.: "Computer Applications" vol. 28 No. 3, Extension to DCF for wireless local area networks-ExDCF, Mar. 1, 2008, pp. 1-4.
Office Action dated Oct. 13, 2022 for Korean Patent Application No. 10-2022-7027973 and its English translation provided by Applicant's foreign counsel.
Notice of Allowance dated Aug. 1, 2023 for U.S. Appl. No. 17/752,863 (now published as US 2022/0295448).
Office Action dated Mar. 28, 2023 for U.S. Appl. No. 17/752,863 (now published as US 2022/0295448).
Office Action dated Nov. 19, 2024 for Korean Patent Application No. 10-2024-7030881 and its English translation provided by Applicant's foreign counsel.

\* cited by examiner

WIRELESS COMMUNICATION METHOD FOR SIMULTANEOUS DATA TRANSMISSION AND RECEPTION AND WIRELESS COMMUNICATION APPARATUS USING SAME

TECHNICAL FIELD

The present invention relates to a wireless communication method for simultaneous transmit and receive data and a wireless communication apparatus using the same, and more particularly, to a wireless communication method and a wireless communication apparatus which can efficiently perform simultaneous data transmission and reception even in an overlapped BSS environment.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has been made in an effort to provide a high-efficiency/high-performance wireless LAN communication in a high-density environment.

In particular, the present invention has also been made in an effort to provide a method in which a terminal can efficiently perform simultaneous transmission/reception of data.

Technical Solution

In order to achieve the objects, the present invention provides a wireless communication method and a wireless communication terminal as below.

An exemplary embodiment of the present invention provides a wireless communication method of a terminal, including: performing a backoff procedure for transmitting data; transmitting a first RTS frame when a backoff counter of the backoff procedure is expired; setting a transmission timer for waiting for transmitting the data when a second RTS frame is received in response to the transmitted first RTS frame; and waiting for transmitting the data based on the set transmission timer.

Another exemplary embodiment of the present invention provides a wireless communication terminal including: a transceiver transmitting and receiving a radio signal; and a processor controlling an operation of the terminal, wherein the processor performs a backoff procedure for transmitting data, transmits a first RTS frame when a backoff counter of the backoff procedure is expired, sets a transmission timer for waiting for transmitting the data when a second RTS frame is received in response to the transmitted first RTS frame, and waits for transmitting the data based on the set transmission timer.

In this case, the second RTS frame may be an RTS frame representing that the terminal is capable of performing simultaneous transmission/reception through a predetermined bit of a preamble.

The first RTS frame may have an address of the terminal as a transmitter address and has an address of a first terminal to which the terminal intends to transmit the data as a receiver address and the second RTS frame may have an address of the first terminal as a transmitter address and has an address of a second terminal to which the first terminal intends to transmit data as a receiver address.

The transmission timer may be set to at least include a short interframe space (SIFS) time and a time required for transmitting a CTS.

The data may be transmitted when the set transmission timer is expired, and when a duration field value of the second RTS frame is larger than a duration field value of the first RTS frame, a duration field value of the transmitted data may be modified based on the duration field value of the second RTS frame.

An acknowledgment timer for waiting for an ACK frame after completing the transmission of the data is set when the duration field value of the second RTS frame is larger than the duration field value of the first RTS frame.

Yet another exemplary embodiment of the present invention provides a wireless communication method of a terminal, including: performing a backoff procedure for transmitting data; suspending the backoff procedure when a first RTS frame having an address of the terminal as a receiver address is received before a backoff counter of the backoff procedure is expired; and transmitting a second RTS frame for simultaneous transmission/reception of the data in response to reception of the first RTS frame.

Still yet another exemplary embodiment of the present invention provides a wireless communication terminal including: a transceiver transmitting and receiving a radio signal; and a processor controlling an operation of the terminal, wherein the processor performs a backoff procedure for transmitting data, suspends the backoff procedure when a first RTS frame having an address of the terminal as a receiver address is received before a backoff counter of the backoff procedure is expired, and transmits a second RTS frame for simultaneous transmission/reception of the data in response to reception of the first RTS frame.

In this case, the first RTS frame may have an address of a first terminal that intends to transmit data to the terminal as a transmitter address and has an address of the terminal as a receiver address and the second RTS frame may have the address of the terminal as a transmitter address and has an address of a second terminal to which the terminal intends to transmit data as a receiver address.

When a duration field value of the first RTS frame is larger than a duration value required for transmitting the data, a duration field value of the transmitted second RTS frame may be adjusted based on the duration field value of the first RTS frame.

Still yet another exemplary embodiment of the present invention provides a wireless communication method of a terminal, including: performing a backoff procedure for transmitting data; performing an additional backoff procedure by using an extended backoff counter when at least one of an RTS frame and a CTS frame is not received before a backoff counter of the backoff procedure is expired; suspending the additional backoff procedure when a first RTS frame having an address of the terminal as a receiver address is received before the extended backoff counter is expired; and transmitting a second RTS frame for simultaneous transmission/reception of the data in response to reception of the first RTS frame.

Still yet another exemplary embodiment of the present invention provides a wireless communication terminal including: a transceiver transmitting and receiving a radio signal; and a processor controlling an operation of the terminal, wherein the processor performs a backoff procedure for transmitting data; performs an additional backoff procedure by using an extended backoff counter when at least one of an RTS frame and a CTS frame is not received before a backoff counter of the backoff procedure is expired; suspends the additional backoff procedure when a first RTS frame having an address of the terminal as a receiver address is received before the extended backoff counter is expired; and transmits a second RTS frame for simultaneous transmission/reception of the data in response to reception of the first RTS frame.

In this case, the extended backoff counter may be determined based on a value obtained by multiplying a backoff counter value allocated to the terminal by a predetermined proportional constant.

The terminal may be a terminal which may be capable of performing simultaneous transmission and reception of data and an initial contention window value for setting the backoff counter of the terminal may be set to be larger than a normal initial contention window value.

Next, still yet another exemplary embodiment of the present invention provides a wireless communication method of a terminal, including: receiving a request frame for uplink data transmission from at least one external terminal; and transmitting a trigger frame indicating simultaneous transmission of uplink data of the at least one external terminal transmitting the request frame for the uplink data transmission.

Still yet another exemplary embodiment of the present invention provides a wireless communication terminal including: a transceiver transmitting and receiving a radio signal; and a processor controlling an operation of the terminal, wherein the processor receives a request frame for uplink data transmission from at least one external terminal; and transmits a trigger frame indicating simultaneous transmission of uplink data of the at least one external terminal transmitting the request frame for the uplink data transmission.

In this case, at least one external terminal (hereinafter, referred to as a simultaneous transmit terminal) that will perform the simultaneous data transmission may be indicated by a predetermined bit of a preamble of the trigger frame.

A duration field of the trigger frame may be determined based on the largest value of duration(s) of the uplink data of the at least one simultaneous transmit terminal.

A transmission timing of the uplink data of the at least one simultaneous transmit terminal may be determined based on the trigger frame.

A separate waiting time for receiving a request frame for the uplink data transmission from the at least one external terminal may be set for the terminal.

Next, still yet another exemplary embodiment of the present invention provides a wireless communication method of a terminal, including: receiving a trigger frame indicating simultaneous transmission of uplink data of at least one terminal from an AP; and transmitting uplink data to the AP in response to the reception of the trigger frame.

Still yet another exemplary embodiment of the present invention provides a wireless communication terminal including: a transceiver transmitting and receiving a radio signal; and a processor controlling an operation of the terminal, wherein the processor receives a trigger frame indicating simultaneous transmission of uplink data of at least one terminal from an AP and transmits uplink data to the AP in response to the reception of the trigger frame.

In this case, the uplink data transmission may be simultaneously performed by a plurality of terminals indicated by the trigger frame.

The uplink data transmission is performed at a predetermined time in response to the reception of the trigger frame.

Advantageous Effects

According to exemplary embodiments of the present invention, all matters for simultaneous transmission/reception of data are set by using an RTS/CTS frame used in a wireless LAN in the related art to enable data to be simultaneously transmitted/received while minimizing a change of a system in the related art.

In addition, since an additional step is not required, in which communication terminals negotiate with each other for the simultaneous data transmission and reception of data, transmission efficiency per hour can be increased.

Furthermore, efficiency of a simultaneous data transmission/reception technology is enhanced to increase the data transmission rate per hour.

In addition, by setting an efficient network allocation vector (NAV), interference problems with terminals in an adjacent BSS can be solved, which may potentially occur at the time of performing the simultaneous data transmission/reception.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2014-0063358, 10-2014-0063361 and 10-2014-0076102 filed in the Korean Intellectual Property Office and the embodiments and mentioned items described in the respective applications are included in the Detailed Description of the present application.

Figure 1:
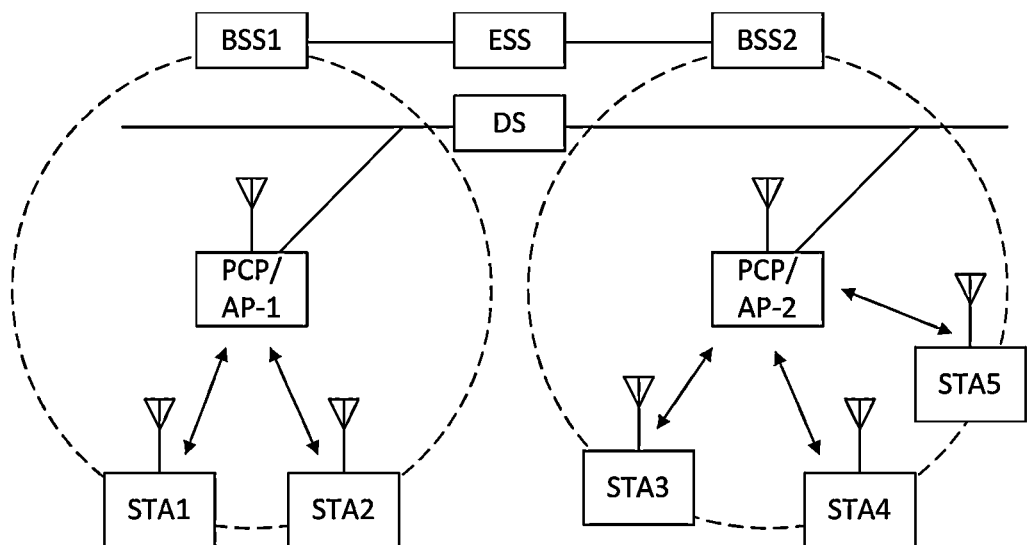
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, as a concept including all wireless LAN communication devices such as the station and the AP, a term 'terminal' may be used. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
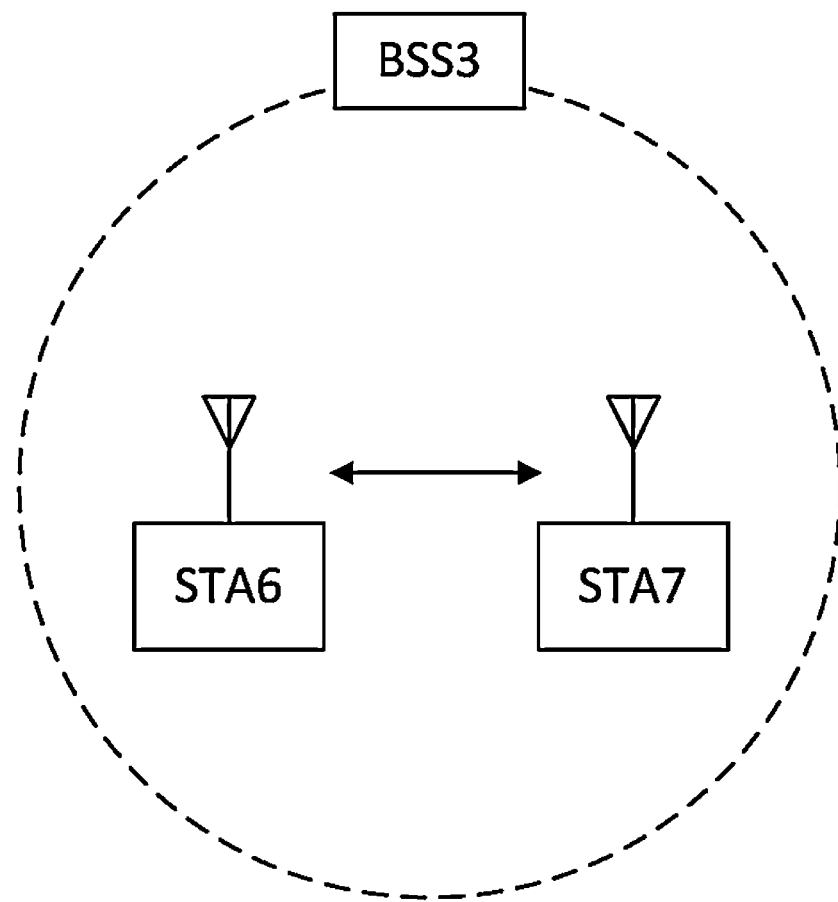
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
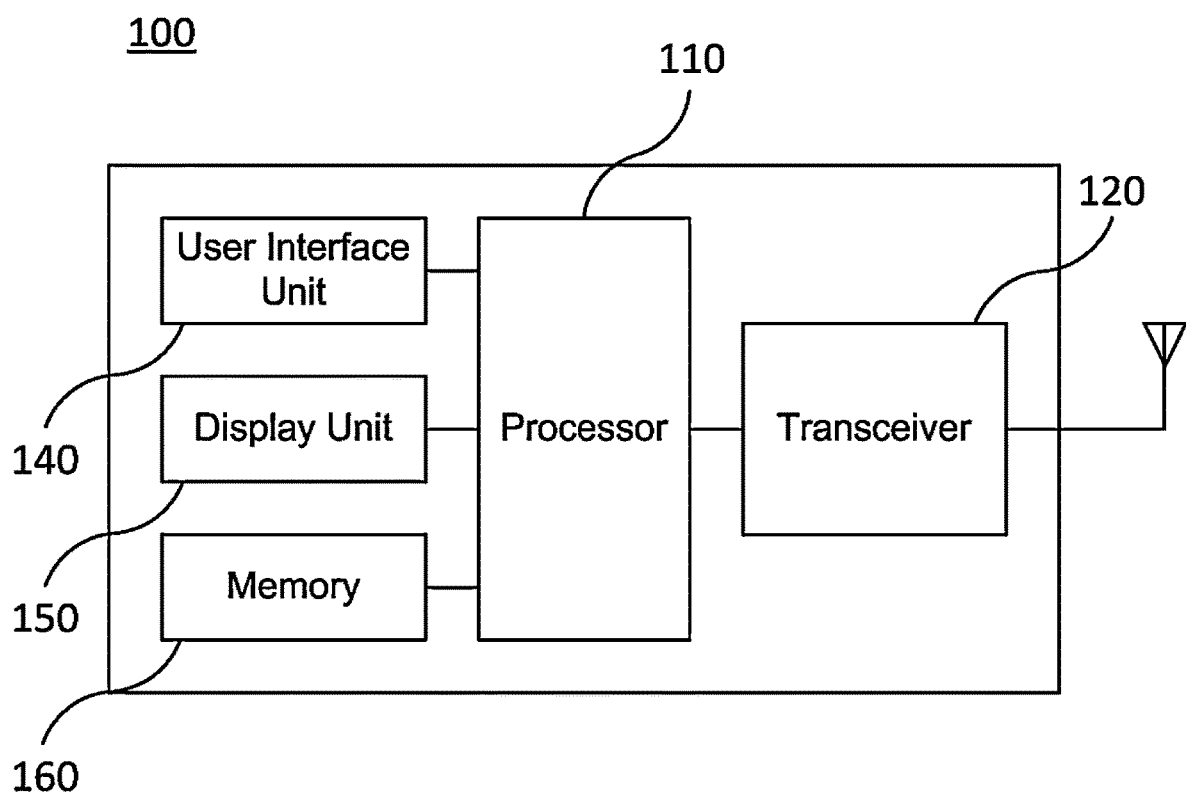
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a radio signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of radio signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
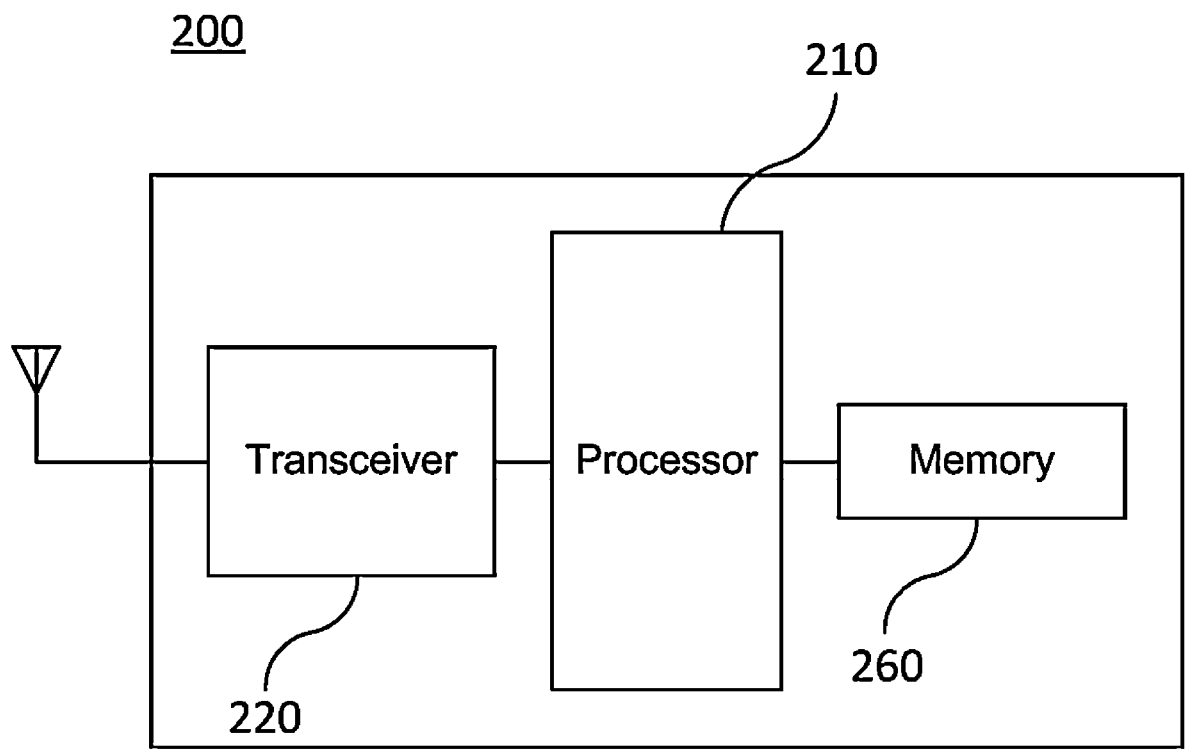
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as radio signal transmission/reception of the AP 200 according to the embodiment of the present invention. A detailed embodiment thereof will be described below.

Figure 5:
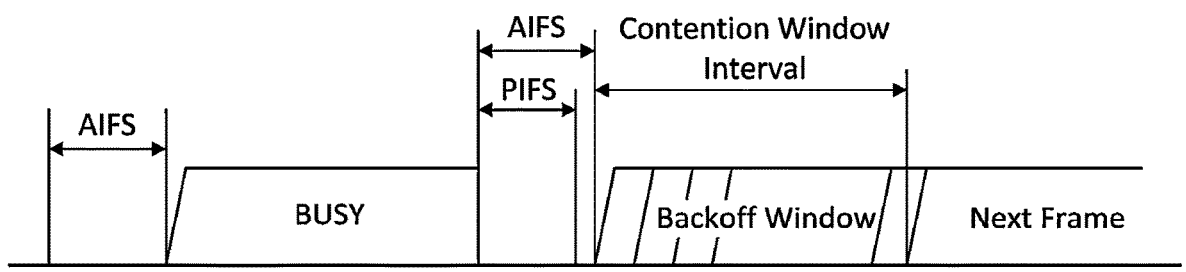
FIG. 5 is a diagram illustrating a carrier sense multiple access (CSMA)/collision avoidance (CA) method used in wireless LAN communication.

FIG. 5 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a radio signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a radio signal having the CCA threshold or more, which is received by the terminal, indicates the corresponding terminal as a receiver, the terminal processes the received radio signal. Meanwhile, when a radio signal is not sensed in the corresponding channel or a radio signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number allocated to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are allocated with new random numbers, respectively to perform the backoff procedure again. According to an embodiment, a random number newly allocated to each terminal may be decided within a range (2*CW) which is twice larger than a range (a contention window, CW) of a random number which the corresponding terminal is previously allocated with. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 6:
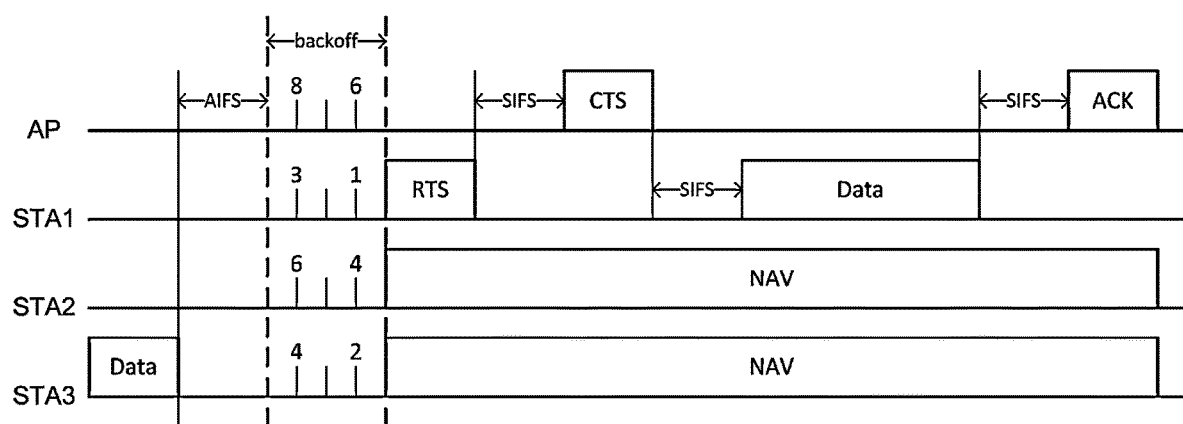
FIG. 6 is a diagram illustrating a method for performing a distributed coordination function (DCF) using a request to send (RTS) frame and a clear to send (CTS) frame.

FIG. 6 is a diagram illustrating a method for performing a distributed coordination function using a request to send (RTS) frame and a clear to send (CTS) frame.

The AP and STAs in the BSS perform contention in order to obtain an authority for transmitting data. When data transmission of the previous step is completed, each terminal having data to be transmitted performs a backoff procedure while decreasing a backoff counter (alternatively, a backoff timer) of a random number allocated to each terminal after an AIFS time elapsed. A transmitting terminal in which the backoff counter is expired transmits the request to send (RTS) frame to notify that the corresponding terminal has data to transmit. According to an exemplary embodiment of FIG. 6, STA1 which holds a lead in the contention with minimum backoff may transmit the RTS frame after the backoff counter is expired. The RTS frame includes information on a receiver address, a transmitter address, and a duration. A receiving terminal (that is, the AP in FIG. 6) that receives the RTS frame transmits the clear to send (CTS) frame after waiting for a short IFS (SIFS) time to notify that the data transmission is available to the transmitting terminal (STA1). The CTS frame includes the information on the receiver address and the duration. In this case, the receiver address of the CTS frame may be set equal to a transmitter address of the RTS frame corresponding thereto, that is, an address of the transmitting terminal (STA1).

The transmitting terminal (STA1) that receives the CTS frame transmits the data after a SIFS time. When the data transmission is completed, the receiving terminal (AP) transmits an acknowledgment (ACK) frame after a SIFS time to notify that the data transmission is completed. When the transmitting terminal (STA1) receives an ACK frame within a predetermined time, the transmitting terminal (STA1) regards that the data transmission is successful. However, when the transmitting terminal does not receive the ACK frame within the predetermined time, the transmitting terminal regards that the data transmission is unsuccessful. Meanwhile, adjacent terminals that receive at least one of the RTS frame and the CTS frame in the course of the transmission set a network allocation vector (NAV) and do not perform the data transmission until the set NAV is expired. In this case, the NAV of each terminal may be set based on a duration field of the received RTS frame or CTS frame.

In the course of the aforementioned data transmission, when the RTS frame or CTS frame of the terminals are not normally transferred to a target terminal (that is, the terminal of the receiver address) due to a situation such as interference or a collision, a subsequent process is suspended. The transmitting terminal (STA1) that transmits the RTS frame regards that the data transmission is unavailable and participates in a next contention by being allocated with a new random number. In this case, the newly allocated random number may be determined within a range (2*CW) twice larger than a previous range (a contention window, CW) of a random number.

Figure 7:
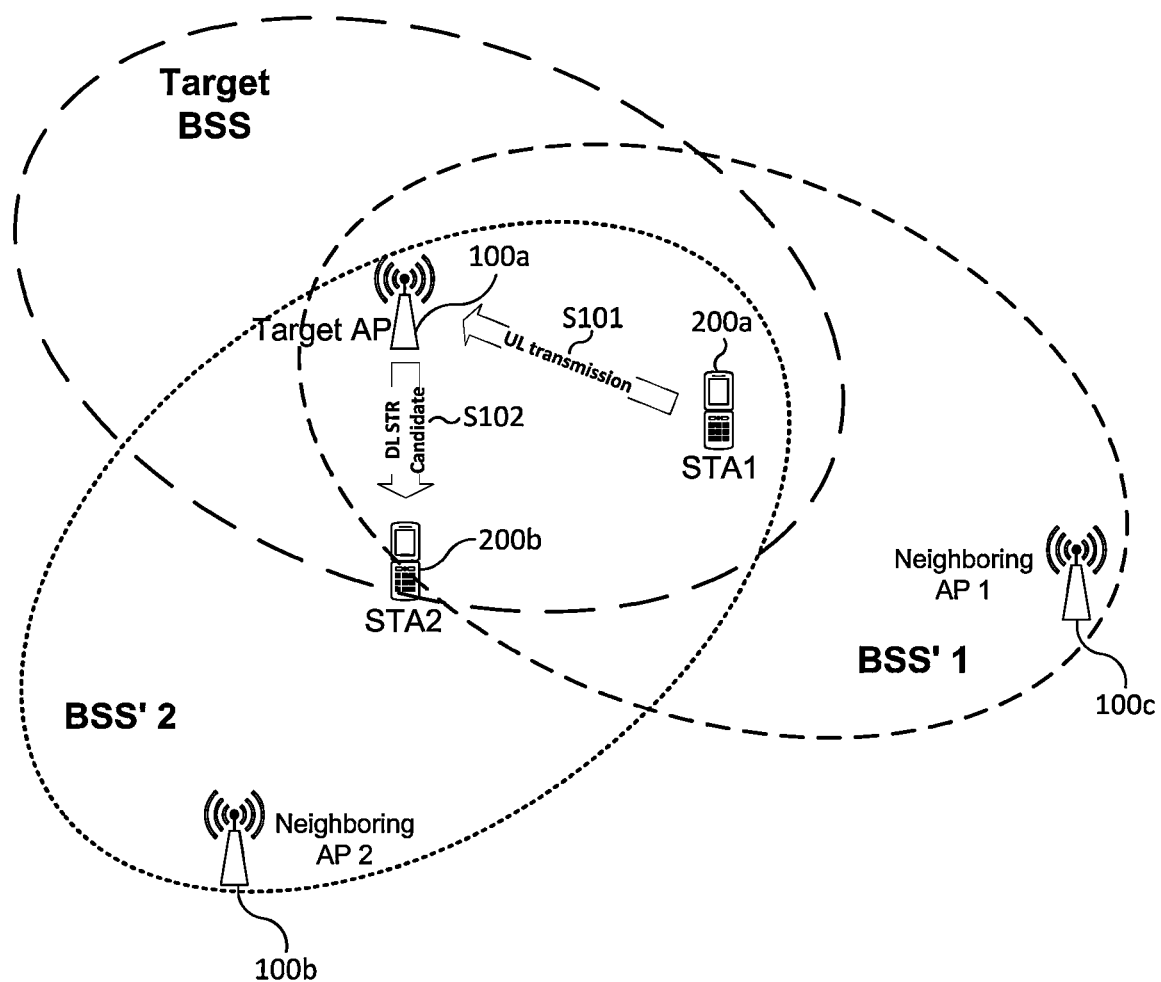
FIG. 7 is a diagram illustrating an exemplary embodiment in which a terminal simultaneously transmits/receives data.

FIG. 7 is a diagram illustrating an exemplary embodiment in which a terminal simultaneously transmits/receives data.

Referring to FIG. 7, in a target BSS operated by a target AP 100a, STA1 200a and STA2 200b are associated with the target AP 100a. The AP and a non-AP STA in the same BSS may transmit and receive data to and from each other. In this case, a single direction link which is toward the AP from the non-AP STA is referred to as an uplink, while the single direction link which is toward the non-AP STA from the AP is referred to as a downlink. Meanwhile, in the exemplary embodiment of FIG. 7, at least a part of communication coverages of BSS' 1 operated by AP1 100c and BSS' 2 operated by AP2 100b overlap with a communication coverage of the target BSS. In a BSS environment in which the communication coverages overlap with each other, each terminal may exert an influence such as interference, or the like on the adjacent BSS at the time of transmitting/receiving data. That is, data transmitted by the STA1 200a may be received by terminals of the BSS' 1 and data transmitted by the STA2 200b may be received by terminals of the BSS' 2. However, in the exemplary embodiment of FIG. 7 and subsequent drawings, it is assumed that the target AP 100a has no interference relationship with the BSS' 1 and the BSS' 2.

According to an exemplary embodiment, the terminal may perform simultaneous transmit and receive (STR) of data in the same frequency band by using technologies including self-interference cancellation (SIC), and the like. That is, when the STA1 200a transmits uplink data to the target AP 100a (S101), the AP 100a may simultaneously transmit downlink data to the STA2 (S102). In this case, in order to provide an efficient and stable communication environment, interference of respective terminals to and from which the data will be simultaneously transmitted and received and interference between each terminal and an adjacent BSS need to be considered.

FIGS. 8 to 19 illustrate various exemplary embodiments of a simultaneous data transmitting/receiving method of a terminal according to the present invention. In the respective exemplary embodiments of FIGS. 8 to 19, duplicated description of a part which is the same as or corresponds to the previous exemplary embodiment will be omitted. In an exemplary embodiment given below, a case where a first terminal transmits an RTS frame to a second terminal may be construed as a meaning that the first terminal transmits the RTS frame in which a transmitter address is an address of the first terminal and a receiver address is an address of the second terminal unless otherwise stated. Further, a case where the first terminal transmits a CTS frame to the second terminal may be construed as a meaning that the first terminal transmits the CTS frame in which a receiver address is an address of the second terminal unless otherwise stated. In addition, a 'simultaneous transmit/receive terminal' indicates a terminal that simultaneously performs data transmission and reception like a full duplex terminal and a 'target terminal that will perform simultaneous transmission/reception' or a 'target terminal of simultaneous transmission/reception' indicates a terminal that transmits the data to the simultaneous transmit/receive terminal or receives the data from the simultaneous transmit/receive terminal. In the present invention, the simultaneous data transmission/reception may mean simultaneous data transmission/reception in the same frequency band.

Figure 8:
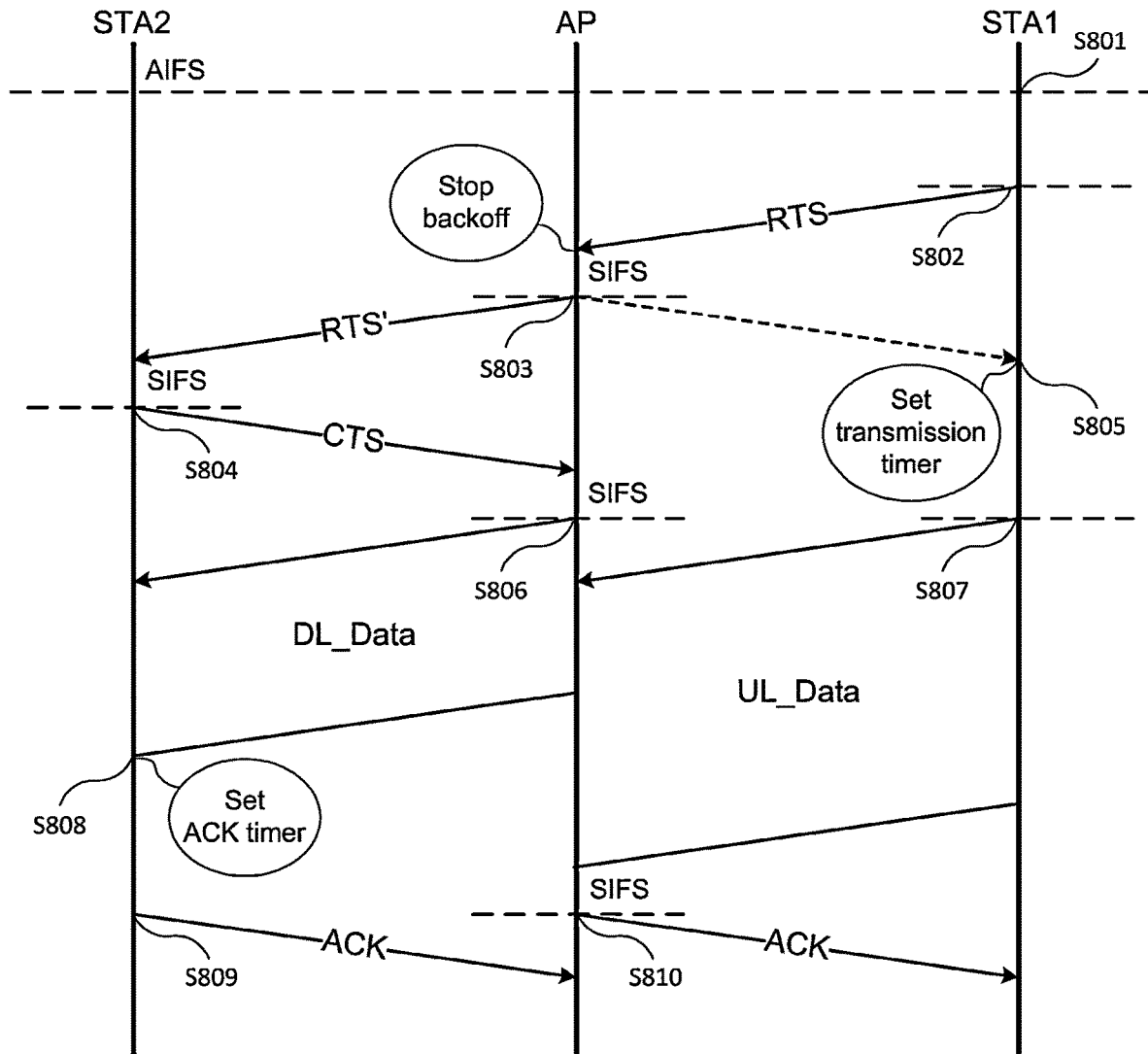
FIG. 8 is a diagram illustrating a data transmitting process according to an exemplary embodiment of the present invention.

FIG. 8 illustrates a data transmitting process according to an exemplary embodiment of the present invention. In the exemplary embodiment of FIG. 8, the AP, the STA1, and the STA2 are the terminals of the target BSS of FIG. 7, and the AP has data for downlink transmission to the STA2, that is, downlink data DL_Data and the STA1 has data for uplink transmission to the AP, that is, uplink data UL_Data. Further, it is assumed that the STA1 and the STA2 have no interference relationship with each other and a duration of the uplink data UL_Data is longer than a duration of the downlink data DL_Data. In the exemplary embodiment of the present invention, a duration of data means a time required for transmitting the corresponding data. The duration of the data may be expressed even as the length of the data, the length of a data frame, or the length of a data packet according to the embodiments. Meanwhile, in FIG. 8 and following drawings, an exemplary embodiment in which the AP performs simultaneous transmission/reception is illustrated, but the present invention is not limited thereto and other wireless communication terminals including a non-AP, and the like may also perform the simultaneous transmission/reception by the same or corresponding method.

First, each terminal waits for an AIFS time after a transmission of previous data is completed (S801). Each terminal having data to be transmitted performs the backoff procedure allocated to each terminal after the AIFS time. That is, in the exemplary embodiment of FIG. 8, the AP and the STA1 perform a backoff procedure for transmitting the downlink data DL_Data and a backoff procedure for transmitting the uplink data UL_Data, respectively. When a backoff counter is expired, the corresponding terminal transmits an RTS frame to notify that the terminal has data to be transmitted. According to the exemplary embodiment of FIG. 8, the STA1 in which the backoff counter is first expired transmits the RTS frame to the AP (S802). Meanwhile, the AP receives the RTS frame having an address of the corresponding terminal as the receiver address before the backoff counter of the corresponding terminal is expired. In this case, the AP having the data DL_Data to be transmitted suspends the backoff procedure and transmits an RTS' frame to the STA2 after a SIFS time (S803). The RTS' frame may be received by the STA1 as well as the STA2.

In the exemplary embodiment of the present invention, the RTS' frame represents that the terminal AP transmitting the corresponding frame is capable of performing simultaneous transmission/reception of data. The STA1 in which the backoff counter is first expired transmits the RTS frame having an address of the STA1 as a transmitter address and having an address of the AP to which the STA1 intends to transmit data as a receiver address. In response thereto, the AP that intends to perform the simultaneous transmission/reception may transmit an RTS' frame having the address of the AP as a transmitter address and having an address of the STA2 to which the AP intends to transmit data as a receiver address. That is, according to an exemplary embodiment of the present invention, the transmitter address of the RTS' frame may be set equal to the receiver address of the RTS frame received by the simultaneous transmit/receive terminal (AP) and the receiver address of the RTS' frame may be set as the address of the target terminal (STA2) to which the simultaneous transmit/receive terminal (AP) intends to transmit data. In this case, the receiver address of the RTS' frame may be different from the transmitter address of the RTS frame.

In the exemplary embodiment of the present invention, the RTS' frame may represent a trigger frame indicating data transmission to a plurality of terminals. The AP may transmit the trigger frame indicating simultaneous transmission of uplink data UL_Data to a plurality of terminals of the BSS. And then the STAs that receive the trigger frame may simultaneously transmit uplink data UL_Data in response thereto. In this case, an uplink data UL_Data transmission timing of each STA may be determined based on the trigger frame. That is, hereinafter, in each drawing, the RTS' frame is described as a frame that triggers simultaneous data transmission/reception of a plurality of terminals, but the present invention is not limited thereto and the RTS' frame may represent a frame that triggers simultaneous transmission of uplink data UL_Data or simultaneous reception of downlink data DL_Data of a plurality of terminals. According to an exemplary embodiment, an indicator that triggers the simultaneous reception of the downlink data DL_Data may be transmitted to each terminal as a separate frame. Alternatively, the indicator bay be transferred to each terminal while be included in preamble information of downlink data DL_Data.

When the RTS' frame indicates the data transmission by a plurality of terminals in the exemplary embodiment of the present invention, the 'simultaneous transmit/receive terminal' of the present invention may be substituted with the 'simultaneous receive terminal' and the 'target terminal of simultaneous transmission/reception' may be substituted with the 'simultaneous transmit terminal'. In this case, the 'simultaneous receive terminal' indicates a terminal that simultaneously receives data from at least one terminal and the 'simultaneous transmit terminal' indicates a terminal that transmits data to the 'simultaneous receive terminal' simultaneously with another terminal.

According to an exemplary embodiment, the RTS' frame has a format of a basic RTS frame and may represent that the terminal (AP) that transmits the corresponding frame is capable of performing simultaneous transmission/reception through a predetermined bit of a preamble. In this case, information representing that the simultaneous transmission/reception is available may be included in a non-legacy preamble which may be decoded by a non-legacy terminal (e.g. an 802.11ax terminal) or expressed through a reserved bit of a VHT-SIG-A field. Meanwhile, the AP may represent target terminals STA1 and STA2 that will perform the simultaneous transmission/reception of data to/from the AP through specific information of the RTS' frame. For example, the AP may transmit an RTS' frame in which group IDs and number of space-time streams (NSTS) bits of the respective target terminals STA1 and STA2 of simultaneous transmission/reception are activated to designate the target terminals that will perform the simultaneous transmission/reception to/from the AP. Further, when the RTS' frame indicates simultaneous data transmission, target terminals that will simultaneously perform uplink transmission to the AP may be designated through the group IDs and the NSTS bits.

According to another exemplary embodiment of the present invention, the terminal (AP) that will perform simultaneous data transmission/reception may change the transmitter address of the RTS' frame to the transmitter address (the address of the STA1) of the RTS frame received by the corresponding terminal (AP) and transmit the changed RTS' frame. That is, according to another exemplary embodiment of the present invention, the transmitter address of the RTS' frame may be set equal to the transmitter address of the RTS frame received by the simultaneous transmit/receive terminal (AP) and the receiver address of the RTS' frame may be set as the address of the target terminal (STA2) to which the simultaneous transmit/receive terminal (AP) intends to transmit data as described above. The RTS' frame of which the transmitter address is modified as above may be used for determining whether the interference occurs between the target terminals STA1 and STA2 of simultaneous transmission/reception. For example, the STA2 that receives the RTS' frame of which the transmitter address is modified inversely tracks a required time of the SIFS to verify whether a history of receiving the RTS frame transmitted by the STA1 is present. When the RTS frame is received SIFS time before a reception time of the RTS' frame, the STA2 may determine that the STA2 has the interference relationship with the STA1. However, when the RTS frame is not received before the SIFS time, the STA2 may determine that the STA2 has a hidden node relationship with the STA1 and the interference does not occur. Moreover, when the STA1 and the STA2 receive an RTS' frame in which both the transmitter address and the receiver address are set as the address of the non-AP STA, the STA1 and the STA2 may identify that the AP attempts the simultaneous transmission/reception of data with the corresponding terminals.

As described in the exemplary embodiment of FIG. 8, when a duration of downlink data DL_Data is shorter than a duration of uplink data UL_Data, the terminal (AP) that will perform the simultaneous data transmission/reception may adjust the duration field of the RTS' frame based on duration information of the uplink data UL_Data. That is, the AP adjusts a duration field value of the RTS' frame by referring to a duration field value of the received RTS frame and the AP may adjust the duration field value of the RTS' frame by further considering additional transmission of the RTS' frame and a time delayed due to a transmission timer to be described below, and the like. In more detail, the duration field value of the RTS' frame may be determined as a value obtained by subtracting a time required for transmitting the RTS' frame from the duration field value of the received RTS frame and adding a time required for transmitting the CTS by the STA2. The STA2 that receives the RTS' frame of which the duration field is adjusted may set acknowledgment (ACK) timer after receiving downlink transmission data as described below. As such, the duration field of the RTS' frame is set based on the larger value of the duration of the downlink data DL_Data and the duration of the uplink data UL_Data, and as a result, data transmission/reception of the respective terminals AP, STA1, and STA2 that participate in the simultaneous data transmission/reception may end at the same time.

As such, the AP may adjust the duration field of the RTS' frame for synchronization of the simultaneous data transmission and/or reception. The duration field of the RTS' frame may be set as the largest value of the duration of at least one uplink data UL_Data for the AP and the duration of at least one downlink data DL_Data of the AP.

The STA2 that receives the RTS' frame from the AP transmits a CTS frame to the AP after SIFS time (S804). According to an exemplary embodiment, when the STA2 verifies that the STA2 has no interference relationship with other target terminal (STA1) of simultaneous data transmission/reception, the STA2 may transmit the CTS frame. As described above, based on whether the RTS frame of another terminal, that is, the STA1 is received within a predetermined time before receiving the RTS' frame, the STA2 may determine whether the STA2 has the interference relationship with the STA1. The STA2 transmits the CTS frame in response to reception of the RTS' frame to represent that the STA2 participates in the simultaneous data transmission/reception to/from the AP.

Meanwhile, the STA1 that receives the RTS' frame after transmitting the RTS frame sets a transmission timer and waits for transmitting uplink data UL_Data until the set transmission timer is expired (S805). In this case, since the STA1 receives not the CTS frame but the RTS' frame in response to the RTS frame transmitted by the corresponding terminal, the STA1 may identify that the simultaneous transmission/reception will be performed. Accordingly, for a synchronization of data transmission with the simultaneous transmit/receive terminal (AP), the STA1 defers the transmission of the uplink data UL_Data for a time of the set transmission timer. The transmission timer may be set to a value equal to or more than a value obtained by adding SIFS time of waiting after the RTS' frame is transmitted and the transmission time of the RTS' frame transmitted through step S804. According to an exemplary embodiment, the transmission timer may be determined as a value equal to or greater than a value (2*SIFS+CTS) obtained by adding a value twice longer than the SIFS time and the time required for transmitting the CTS. In this case, since the time when the CTS frame is transmitted varies depending on a distance between the terminals, a predetermined maximum transmission time T_tx_max may be considered for setting the transmission timer. According to another exemplary embodiment, information on the transmission timer may be obtained through a predetermined bit of the RTS' frame. As such, the transmission timer, which is used for deferring the data transmission of the corresponding terminal (STA1) for synchronization of the data transmission with the simultaneous transmit/receive terminal (AP), may be set based on whether the terminal (STA1) transmitting the RTS frame receives the CTS frame or the RTS' frame in response thereto.

As such, frame transmission of the STA1 and the STA2 to the AP may be performed based on the RTS' frame of the AP. That is, when the AP transmits the RTS' frame (trigger frame), each of the STA1 and the STA2 that receive the transmitted RTS' frame may transmit uplink data UL_Data to the AP at a predetermined time in response to the reception of the RTS' frame.

The AP receives the CTS frame which is uplink data UL_Data from the STA2 after transmitting the RTS' frame and transmits downlink data DL_Data to the STA2 in response thereto (S806). Simultaneously, the STA1 transmits uplink data UL_Data to the AP (S807). When the transmission timer set for the corresponding terminal is expired or when the STA1 receives the downlink data DL_Data transmitted by the AP, the STA1 may start to transmit the uplink data UL_Data. Accordingly, the STA1 may start to transmit the uplink data UL_Data at the same time or a time later than the transmission of the downlink data DL_Data by the AP. Meanwhile, since a process for the simultaneous transmission/reception is added as the AP transmits the RTS' frame, the STA1 may modify and transmit the duration field of the corresponding data at the time of transmitting the uplink data UL_Data.

When the transmission of the downlink data DL_Data from the AP is completed, the STA2 sets the ACK timer and waits for transmitting the ACK frame in response to the downlink data DL_Data until the set response timer is expired (S808). In the present invention, the ACK timer, which is used for deferring the transmission or reception of the ACK frame by the corresponding terminal (STA2) for synchronization of the ACK frame transmission with the simultaneous transmit/receive terminal (AP), may be determined based on a difference value between the duration of the uplink data UL_Data and the duration of the downlink data DL_Data for the simultaneous transmit/receive terminal (AP). When a duration value of the uplink data UL_Data is larger than a duration value of the downlink data DL_Data, the ACK timer is set for the terminal (STA2) that receives the downlink data DL_Data to be used for waiting for transmitting an ACK frame in response to the downlink data DL_Data. On the contrary, when the duration value of the downlink data DL_Data is larger than the duration value of the uplink data UL_Data, the ACK timer is set for the terminal (STA1) that transmits the uplink data UL_Data to be used for waiting for receiving an ACK frame in response to the uplink data UL_Data. In the exemplary embodiment of FIG. 8, when the duration field value of the RTS' frame is modified based on the duration field value of the RTS frame, the STA2 waits for transmitting the ACK frame until the timer based on the modified duration field value of the RTS' frame is expired.

When the set ACK timer is expired, the STA2 transmits an ACK frame to the AP (S809). According to a setting method of the ACK timer, the STA2 may transmit the ACK frame immediately after the ACK timer is expired or transmit the ACK frame a SIFS time after the ACK timer is expired. Meanwhile, when the transmission of the uplink data UL_Data from the STA1 is completed, the AP transmits an ACK frame to the STA1 after a SIFS time (S810). Since the transmission of the ACK frame by the STA2 is deferred based on the ACK timer, the transmission of the ACK frame by the STA2 may be synchronized with the transmission of the ACK frame by the AP. As such, according to the exemplary embodiment of the present invention, the data frame and the ACK frame may be simultaneously transmitted/received by setting the transmission timer and the ACK timer.

In the exemplary embodiment of the present invention, the AP may identify whether the target terminals STA1 and STA2 of simultaneous transmission/reception interfere with each other by various methods. According to an exemplary embodiment, the AP that operates the target BSS may obtain information indicating whether the respective terminals have the interference relationship with each other in advance. Further, according to another exemplary embodiment, whether the STA1 and the STA2 interfere with each other may be determined by considering whether the STA2 receiving the downlink data DL_Data of the AP transmits the CTS frame in response to the reception of the RTS' frame as described below.

Figure 9:
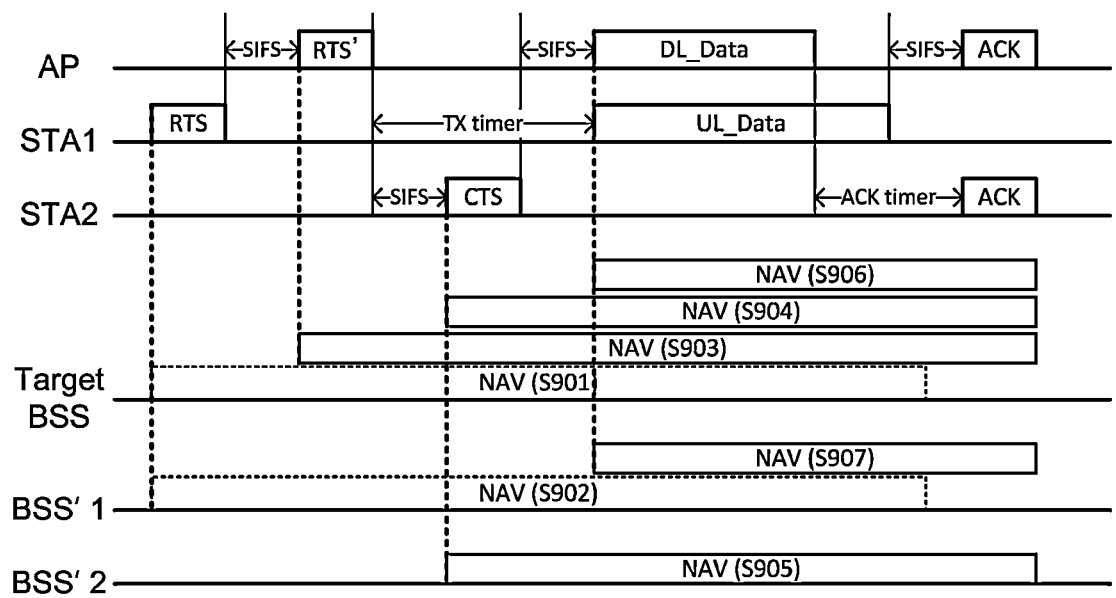
FIG. 9 is a diagram illustrating NAV changes of a terminal of a target BSS and terminals of adjacent BSS (BSS' 1 and BSS' 2) according to the exemplary embodiment of FIG. 8.

FIG. 9 illustrates NAV changes of a terminal of a target BSS and terminals of adjacent BSS (BSS' 1 and BSS' 2) according to the exemplary embodiment of FIG. 8. According to the exemplary embodiment of FIG. 8, since all of the STA1, the STA2, and the AP participate in transmitting/receiving data, the NAV needs to be set for all terminals of the BSS' 1 and the BSS' 2 having the interference relationship with the STA1 and the STA2, respectively in addition to terminals of the target BSS up to the transmission timing of the ACK frames by the STA1 and the STA2.

Referring to FIG. 9, terminals of the target BSS and the BSS' 1 may initially set the NAV based on the RTS frame of the STA1 (S901 and S902). However, when the AP transmits the RTS' frame for simultaneous transmission/reception, terminals of the target BSS that receive the corresponding RTS' frame update the NAV based on the duration field of the RTS' frame (S903). When the STA2 transmits the CTS frame in response to the RTS' frame, terminals of the target BSS and the BSS' 2 that receive the corresponding CTS frame update the NAV based on the duration field of the CTS frame (S904 and S905). In the exemplary embodiment of FIG. 9, the duration fields of the RTS' frame and the CTS frame may be set based on the duration information of the uplink data UL_Data. Accordingly, the terminals that receive the RTS' frame and/or the CTS frame may adjust the NAV based on the duration of the uplink data UL_Data and a set value of the transmission (TX) timer. Meanwhile, when the simultaneous data transmission/reception starts and thus the AP and the STA1 transmit the downlink data DL_Data and the uplink data UL_Data, respectively, terminals of the target BSS and the BSS' 1 that receive the corresponding data update the NAV based on the duration field of the received data (S906 and S907). As such, in the course of performing the simultaneous data transmission/reception, adjacent terminals adjust the NAV by referring to the duration field of at least one of the RTS' frame, the CTS frame, and the transmitted/received data and waits for data transmission based on the adjusted NAV.

Figure 10:
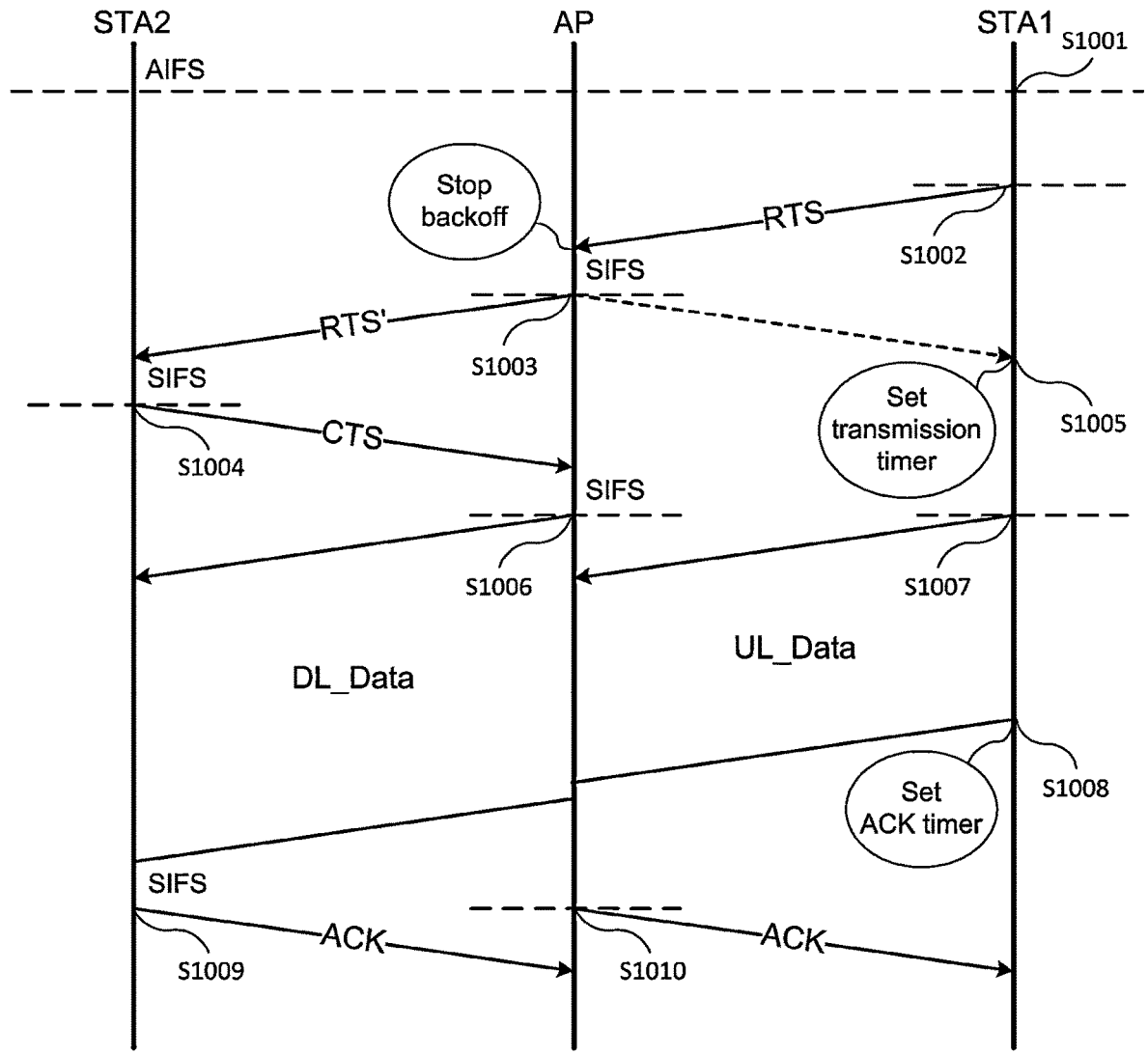
FIG. 10 is a diagram illustrating a data transmitting process according to another exemplary embodiment of the present invention.

FIG. 10 illustrates a data transmitting process according to another exemplary embodiment of the present invention. In the exemplary embodiment of FIG. 10, duplicated description of a part which is the same as or corresponds to the exemplary embodiment of FIG. 8 will be omitted. However, in the exemplary embodiment of FIG. 10, it is assumed that the duration of the downlink data DL_Data is longer than the duration of the uplink data UL_Data unlike the exemplary embodiment of FIG. 8.

In the exemplary embodiment of FIG. 10, steps S1001 and S1002 may be performed similarly to steps S801 and S802 of FIG. 8. Next, the AP that receives the RTS frame before the backoff counter is expired suspends the backoff procedure of the corresponding terminal and transmits the RTS' frame to the STA2 after a SIFS time (S1003).

As described in the exemplary embodiment, the AP transmits the RTS' frame to represent that the corresponding terminal (AP) is capable of performing simultaneous transmission/reception of data. In the exemplary embodiment of FIG. 10, since the duration of the downlink data DL_Data is longer than the duration of the uplink data UL_Data, the duration field of the RTS' frame may be set based on the duration of the downlink data DL_Data transmitted by the AP. That is, the AP sets the duration field value of the RTS' frame based on the data DL_Data which the corresponding terminal will transmit and the AP may adjust the duration field value of the RTS' frame by considering a time delayed due to the transmission timer of the STA1 that will transmit the uplink data UL_Data.

The STA2 that receives the RTS' frame transmits the CTS frame to the AP like step S804 of FIG. 8 (S1004). Meanwhile, the STA1 that receives the RTS' frame after transmitting the RTS frame may identify that the simultaneous data transmission/reception will be performed. As described in the aforementioned exemplary embodiment, the STA1 sets the transmission timer in response to the reception of the RTS' frame and waits for transmitting the uplink data UL_Data until the set transmission timer is expired (S1005). A detailed exemplary embodiment of the setting of the transmission timer is described above in FIG. 8.

The AP receives the CTS frame after transmitting the RTS' frame and transmits the downlink data DL_Data to the STA2 in response thereto (S1006). Simultaneously, the STA1 transmits the uplink data UL_Data to the AP (S1007). When the transmission timer set for the corresponding terminal is expired or when the STA1 receives the downlink data DL_Data transmitted by the AP, the STA1 may start to transmit the uplink data UL_Data. Meanwhile, according to the exemplary embodiment of FIG. 10, the STA1 may adjust the duration field of the uplink data UL_Data based on the duration field of the received RTS' frame. The STA1 may determine whether the duration of the downlink data DL_Data to be transmitted by the AP is longer than the duration of the uplink data UL_Data to be transmitted by the STA1 based on the duration field of the received RTS' frame. The STA1 may determine that the duration of the downlink data DL_Data is longer than the duration of the uplink data UL_Data when the duration field value of the RTS' frame is larger than the duration field value of the RTS frame transmitted by the STA1. Accordingly, the STA1 may modify the duration field value of the transmitted uplink data UL_Data based on the duration field value of the RTS' frame.

When the transmission of the uplink data UL_Data to the AP is completed, the STA1 sets the ACK timer and waits for receiving the ACK frame in response to the uplink data UL_Data until the set ACK timer is expired (S1008). As described above, the ACK timer, which is used for deferring the transmission or reception of the ACK frame by the corresponding terminal (STA2) for synchronization of the ACK frame transmission with the simultaneous transmit/receive terminal (AP), may be determined based on the difference value between the duration of the uplink data UL_Data and the duration of the downlink data DL_Data for the simultaneous transmit/receive terminal (AP). When the duration of the uplink data UL_Data is shorter than the duration of the downlink data DL_Data as described in the exemplary embodiment of FIG. 10, the transmission of the ACK frame in response to the uplink data UL_Data may be delayed until the transmission of the downlink data DL_Data by the AP is completed. As a result, a response timeout may occur in the STA1 that waits for receiving the ACK frame after transmitting the uplink data UL_Data. Accordingly, the STA1 sets the ACK timer based on the duration field of the received RTS' frame and waits for receiving the ACK frame until the set ACK timer is expired. According to an exemplary embodiment, the STA1 may set the ACK timer only when the duration field value of the received RTS' frame is larger than the duration field value of the RTS frame. When the ACK frame is received before the ACK timer is expired, the STA1 determines that the transmission of the uplink data UL_Data is completed. However, when the ACK frame is not received until the ACK timer is expired, the STA1 may perform a retransmission process by regarding that the transmission of the uplink data UL_Data is unsuccessful.

Meanwhile, when the transmission of the downlink data DL_Data from the AP is completed, the STA2 transmits the ACK frame to the AP after a SIFS time (S1009). Similarly, the AP transmits the ACK frame to the STA1 a SIFS time after the transmission of the downlink data DL_Data to the STA2 is completed (S1010). Accordingly, the transmission of the ACK frame in response to the downlink data DL_Data and the transmission of the ACK frame in response to the uplink data UL_Data may be synchronized with each other.

Figure 11:
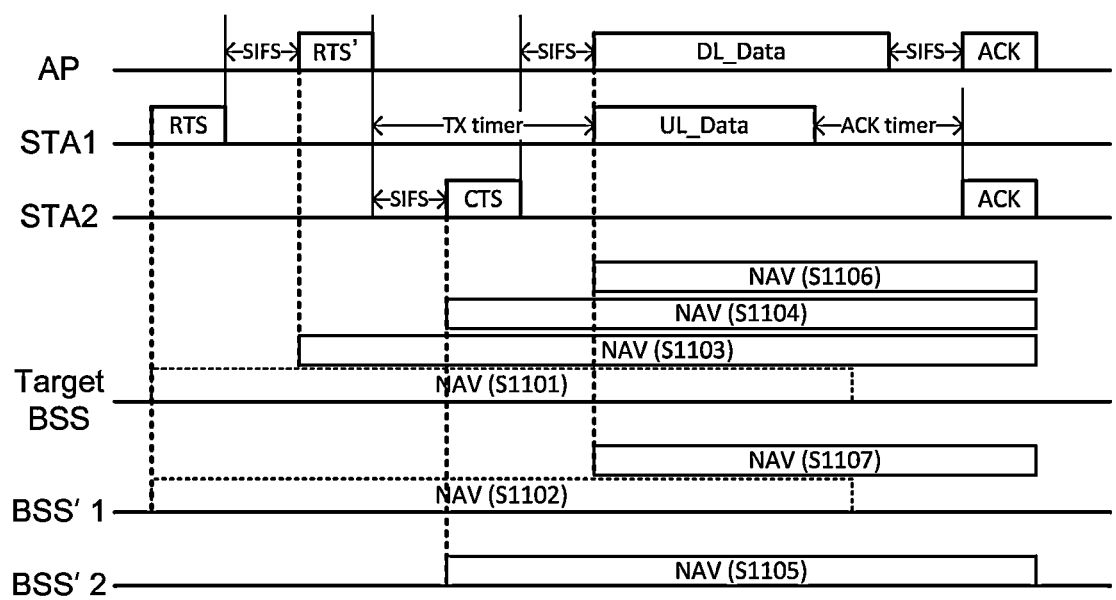
FIG. 11 is a diagram illustrating NAV changes of a terminal of a target BSS and terminals of adjacent BSS (BSS' 1 and BSS' 2) according to the exemplary embodiment of FIG. 10.

FIG. 11 illustrates NAV changes of a terminal of a target BSS and terminals of adjacent BSS (BSS' 1 and BSS' 2) according to the exemplary embodiment of FIG. 10. Referring to FIG. 11, terminals of the target BSS and the BSS' 1 may initially set the NAV based on the RTS frame of the STA1 (S1101 and S1102). However, when the AP transmits the RTS' frame for simultaneous transmission/reception, terminals of the target BSS that receive the corresponding RTS' frame update the NAV based on the duration field of the RTS' frame (S1103). When the STA2 transmits the CTS frame in response to the RTS' frame, terminals of the target BSS and the BSS' 2 that receive the corresponding CTS frame update the NAV based on the duration field of the CTS frame (S1104 and S1105). In the exemplary embodiment of FIG. 11, the duration fields of the RTS' frame and the CTS frame may be set based on the duration information of the downlink data DL_Data. Accordingly, the terminals that receive the RTS' frame and/or the CTS frame may adjust the NAV based on the duration of the downlink data DL_Data and the set value of the transmission (TX) timer. Meanwhile, when the simultaneous data transmission/reception starts and thus the AP and the STA1 transmit the downlink data DL_Data and the uplink data UL_Data, respectively, terminals of the target BSS and the BSS' 1 that receive the corresponding data update the NAV based on the duration field of the received data (S1106 and S1107). In this case, the duration field of the uplink data UL_Data may be adjusted based on the duration field of the RTS' frame as described above.

Figure 12:
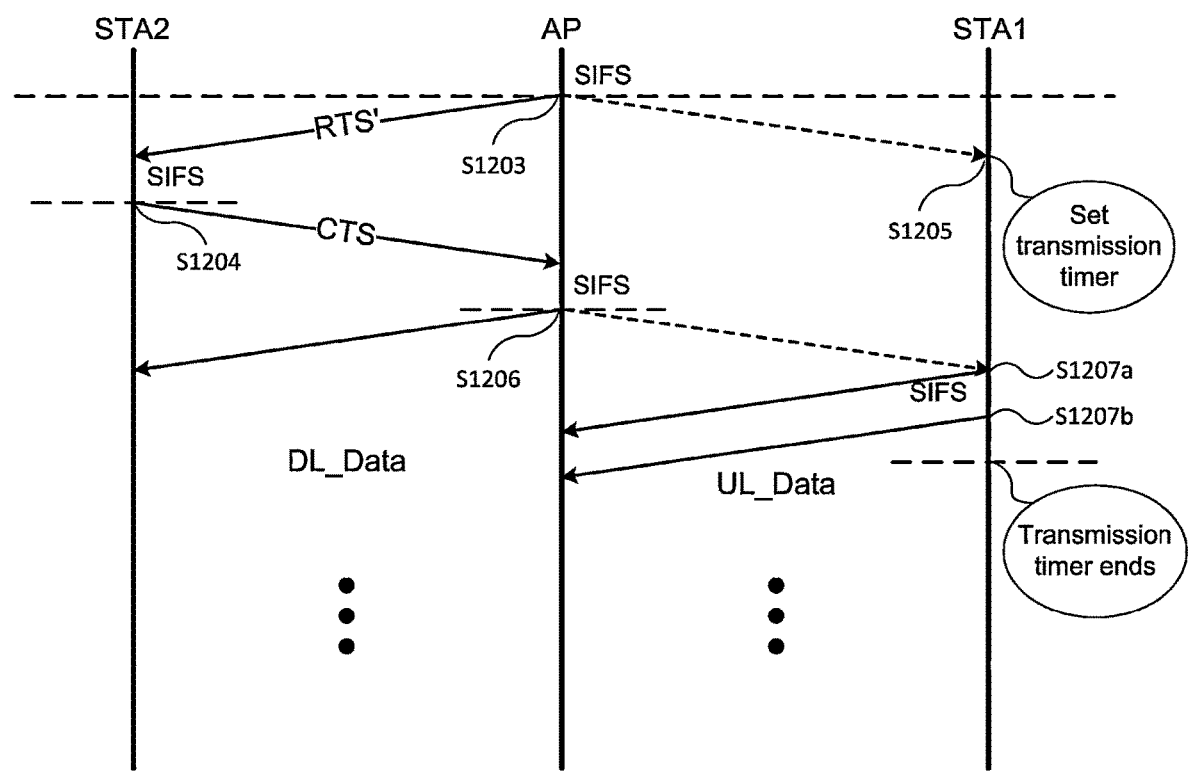
FIG. 12 is a diagram illustrating another exemplary embodiment in which a terminal transmits data for simultaneous transmission/reception according to the present invention.

FIG. 12 illustrates another exemplary embodiment in which a terminal transmits data for simultaneous transmission/reception according to the present invention. In the exemplary embodiment of FIG. 12, processes (S1201 to S1203) up to a step in which the AP transmits the RTS' frame may be performed similarly to steps S801 to S803 of FIG. 8 or steps S1001 to S1003 of FIG. 10. Next, the STA1 that receives the RTS' frame from the AP sets the transmission timer (S1205). In this case, the transmission timer may be set by various methods as described in the exemplary embodiment, and the predetermined maximum transmission time T_tx_max, and the like may be additionally considered in order to prevent a mis-operation such as a transmission delay, or the like depending on the distance between the terminals. The STA1 waits for transmitting the uplink data UL_Data until the set transmission timer is expired.

Meanwhile, the AP that receives a CTS frame corresponding to the RTS' frame from the STA2 transmits downlink data DL_Data to the STA2 (S1206). According to the exemplary embodiment of FIG. 12, the STA1 that intends to transmit uplink data UL_Data may start to transmit the uplink data UL_Data based on whether the downlink data DL_Data from the AP is received. That is, when the STA1 receives the downlink data DL_Data from the AP even before the set transmission timer is expired, the STA1 may terminate the transmission timer and transmit uplink data UL_Data (S1207a). Alternatively, when the STA1 receives the downlink data DL_Data from the AP, the STA1 may transmit the uplink data UL_Data after waiting for a SIFS time (S1207b). As such, according to the exemplary embodiment of FIG. 12, the transmission timer for preventing the mis-operations of the terminals may be set to a sufficient long time and the target terminal (STA1) of simultaneous transmission/reception may verify that the transmission data DL_Data of the simultaneous transmit/receive terminal (AP) is received and thereafter, perform the transmission of the data UL_Data.

Figure 13:
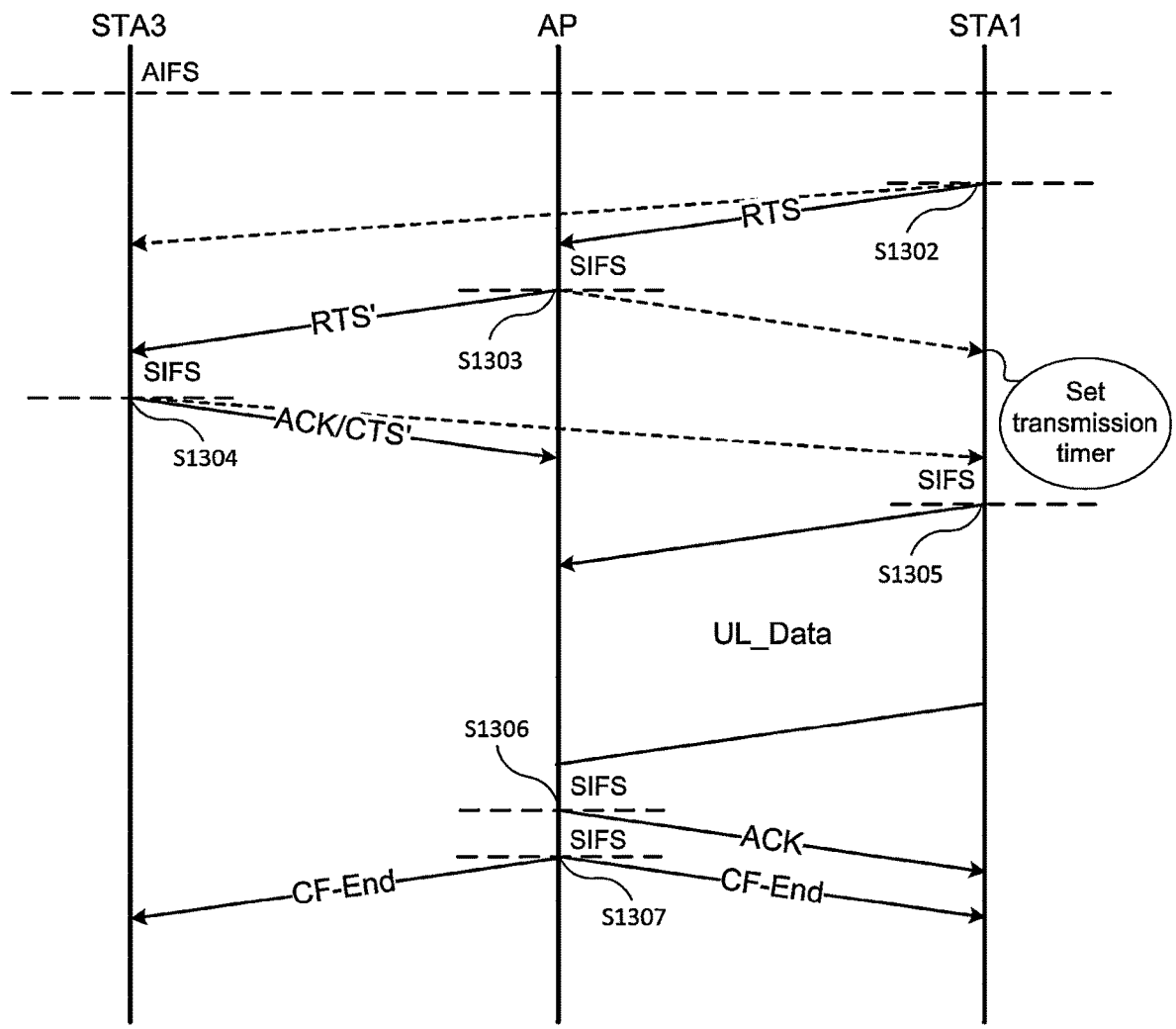
FIG. 13 is a diagram illustrating a data transmitting process according to yet another exemplary embodiment of the present invention.

FIG. 13 illustrates a data transmitting process according to yet another exemplary embodiment of the present invention. In the exemplary embodiment of FIG. 13, duplicated description of a part which is the same as or corresponds to the exemplary embodiment of FIG. 8 or 10 will be omitted. However, in the exemplary embodiment of FIG. 13, a STA3 is the terminal of the target BSS of FIG. 7 and has an interference relationship with the STA1. Further, the AP has downlink data DL_Data to the STA3 and the STA1 has uplink data UL_Data to the AP.

In the exemplary embodiment of FIG. 13, when the STA1 in which the backoff counter is expired transmits the RTS frame to the AP (S1302), the STA3 that has the interference relationship with the STA1 may receive the RTS frame as well as the AP. As described in the exemplary embodiment, the AP transmits the RTS' frame to the STA3 in response to the RTS frame (S1303). The STA3 that receives the RTS' frame may verify that the RTS frame of the STA1 is received within a predetermined time before receiving the RTS' frame and identify that the AP has the interference relationship with another target terminal (STA1) that intends to perform the simultaneous transmission/reception.

Accordingly, the STA3 may transmit not the CTS frame but another frame, that is, an ACK frame or a CTS' frame to the AP in order to notify that the STA3 may not participate in the simultaneous transmission/reception to the AP (S1304). Herein, the CTS' frame may represent that the terminal (STA3) transmitting the corresponding frame may not become the target terminal of simultaneous transmission/reception and according to an exemplary embodiment, a duration field value thereof may be set to 0. According to another exemplary embodiment, the CTS' frame may represent whether the terminal (STA3) transmitting the corresponding frame may become the target terminal of simultaneous transmission/reception through a predetermined bit of the preamble. Further, as described in the exemplary embodiment, information representing whether the terminal (STA3) transmitting the corresponding frame may become the target terminal of simultaneous transmission/reception may be included in the non-legacy preamble which may be decoded by the non-legacy terminal (e.g. the 802.11ax terminal) or expressed through the reserved bit of the VHT-SIG-A field.

The AP that receives the ACK frame or the CTS' frame from the STA3 does not transmit the downlink data DL_Data. Meanwhile, the STA1 may receive the ACK frame or the CTS' frame of the STA3 and transmit the uplink data UL_Data after a SIFS time (S1305). According to another exemplary embodiment, the STA1 that receives the RTS' frame may set the transmission timer as described above and when the set transmission timer is expired, the STA1 may transmit the uplink data UL_Data.

When the transmission of the uplink data UL_Data from the STA1 is completed, the AP transmits an ACK frame after a SIFS time (S1306). In the exemplary embodiment of FIG. 13, since the simultaneous data transmission/reception is not performed, setting a separate ACK timer is not required. The STA1 that receives the ACK frame from the AP may determine that the transmission of the uplink data UL_Data is completed. Meanwhile, according to the exemplary embodiment of FIG. 13, the AP transmits a CF End frame a SIFS time after transmitting the ACK frame (S1307). Terminals of the same BSS that receive the CF-End frame reset a NAV timer of the corresponding terminal to 0. Accordingly, it is possible to prevent transmission of subsequent data from being delayed by an unnecessary NAV after the data transmission is completed.

The CF-End frame may be used for resetting the NAV timer or a transmission opportunity (TXOP) of terminals that fail in the simultaneous transmission/reception (alternatively, simultaneous data transmission) of the data. As described above, some terminals among terminals in which the simultaneous transmission/reception (alternatively, the simultaneous data transmission) of the data is triggered by the trigger frame such as the RTS' frame, or the like may fail in the simultaneous data transmission/reception (alternatively, the simultaneous data transmission). In this case, each terminal may require resetting the NAV timer or the TXOP through the CF-End frame. For example, the duration field of the trigger frame may be set to the largest value among the durations of one or more uplink data UL_Data for the AP. However, an actual time required for the simultaneous transmission/reception of uplink data UL_Data may be decreased than the duration field of the trigger frame due to a failure of the transmission of uplink data UL_Data of some terminals. In this case, the AP may notify that a simultaneous data transmission condition is finished by transmitting the CF-End frame and each terminal that receives the frame may prevent the transmission delay of the subsequent data by resetting the NAV timer or the TXOP.

Figure 14:
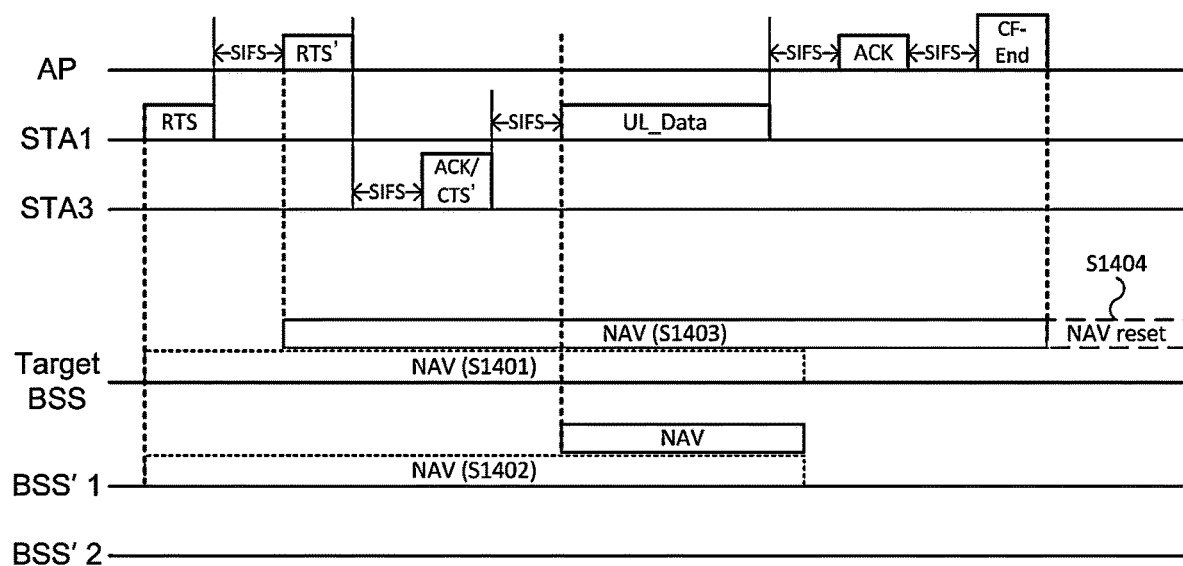
FIG. 14 is a diagram illustrating NAV changes of a terminal of a target BSS and terminals of adjacent BSS (BSS' 1 and BSS' 2) according to the exemplary embodiment of FIG. 13.

FIG. 14 illustrates NAV changes of a terminal of a target BSS and terminals of adjacent BSS (BSS' 1 and BSS' 2) according to the exemplary embodiment of FIG. 13. Referring to FIG. 14, terminals of the target BSS and the BSS' 1 may initially set the NAV based on the RTS frame of the STA1 (S1401 and S1402). However, when the AP transmits the RTS' frame for simultaneous transmission/reception, terminals of the target BSS that receive the corresponding RTS' frame update the NAV based on the duration field of the RTS' frame (S1403). In the exemplary embodiment of FIG. 14, since the duration value of the downlink data DL_Data is larger than the duration value of the uplink data UL_Data, the terminals of the target BSS updating the NAV are allocated with a NAV 1403 longer than a NAV S1401 which is previously set based on the RTS' frame. However, according to the exemplary embodiment of FIG. 14, since the AP that receives all of the uplink data UL_Data transmits the CF-End frame, the terminals of the target BSS may initialize the NAV (S1404). Meanwhile, the terminals of the BSS' 2 may receive the CTS' frame (alternatively, the ACK frame) from the STA3 and since the duration field value of the corresponding frame is set to 0, the unnecessary NAV may be prevented from being set.

Figure 15:
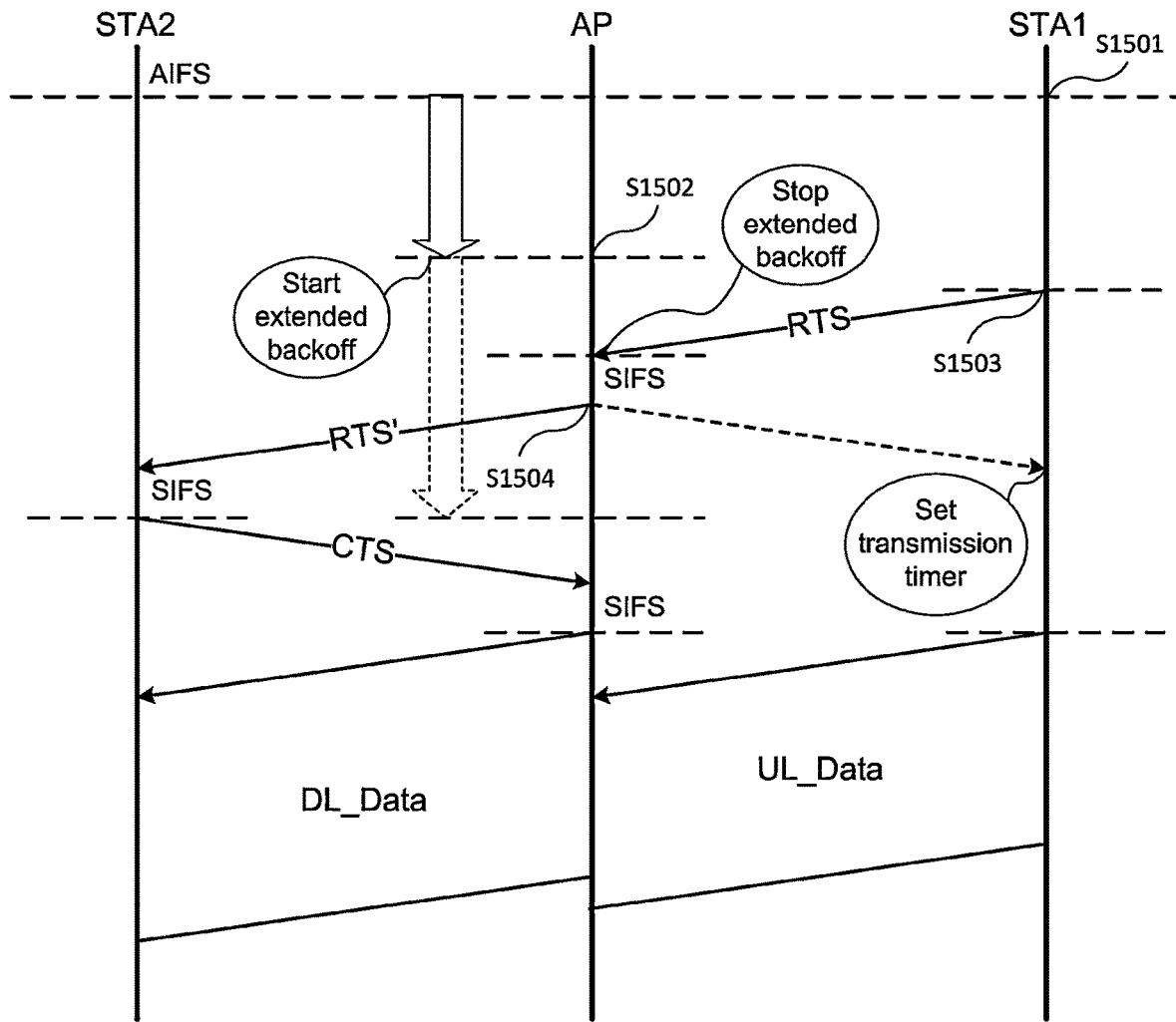
FIG. 15 is a diagram illustrating an exemplary embodiment of a data transmitting method using an extended backoff counter.
Figure 16:
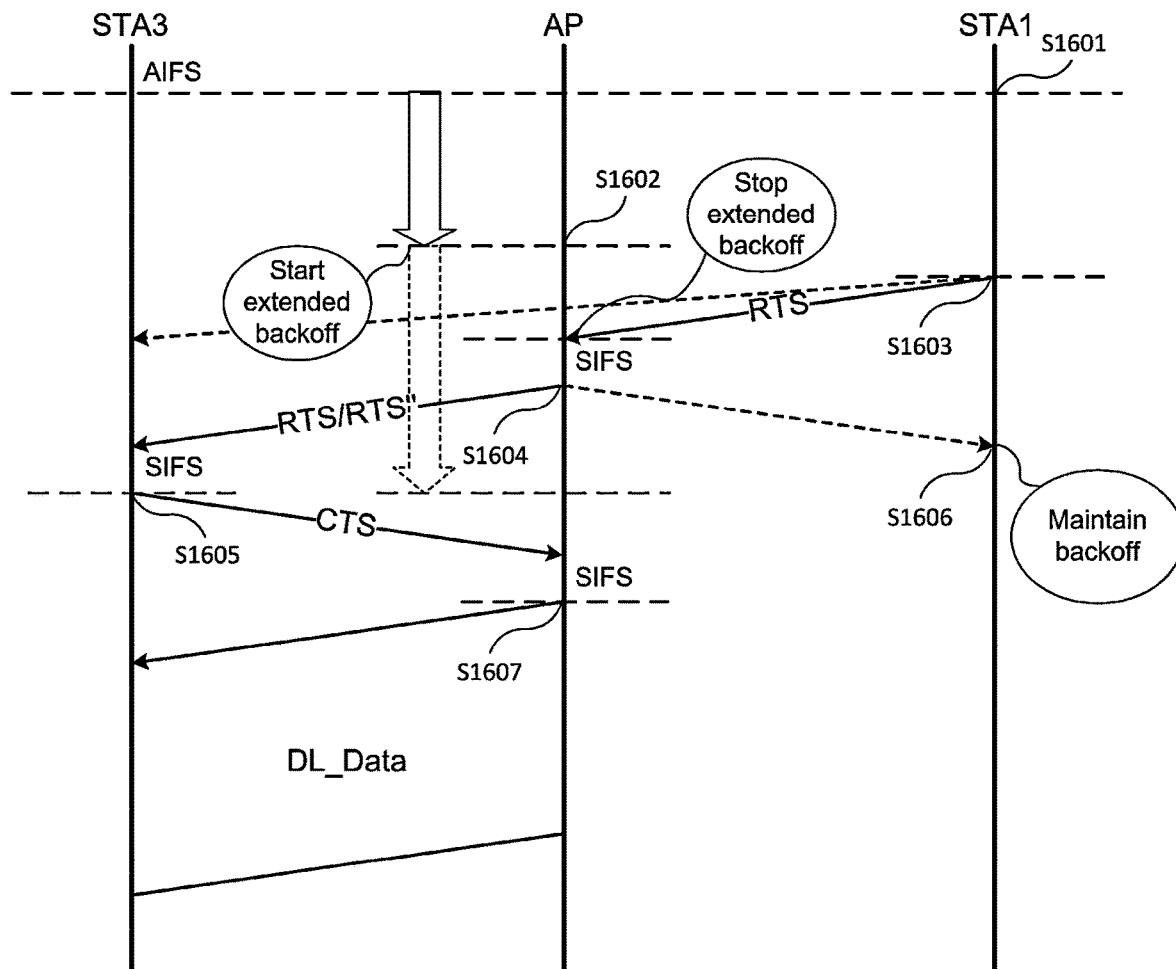
FIG. 16 is a diagram illustrating another exemplary embodiment of a data transmitting method using an extended backoff counter.
Figure 17:
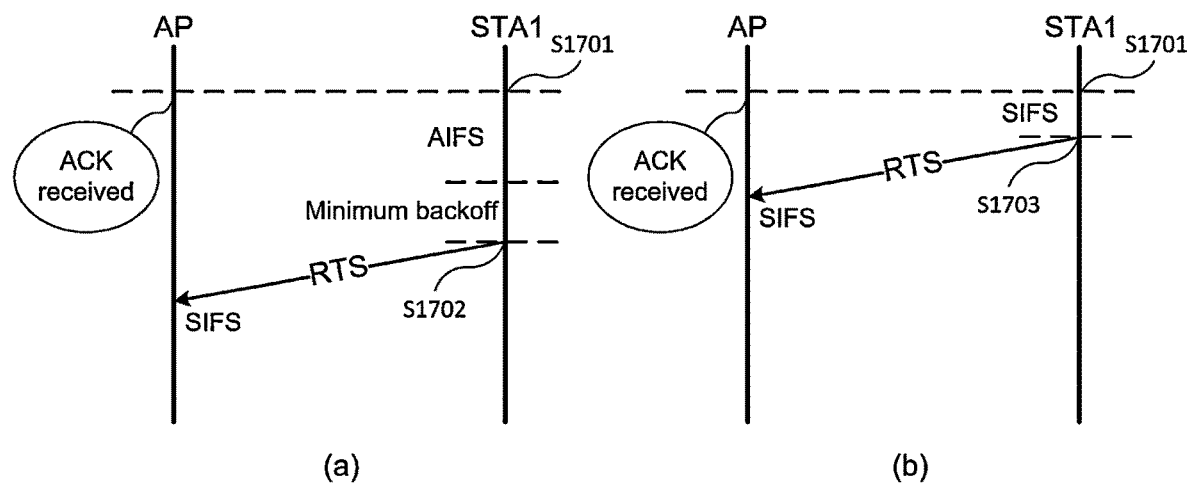
FIG. 17 is a diagram illustrating a method for guaranteeing a priority in a next backoff contention with respect to a terminal which fails to transmit the data in the exemplary embodiment of FIG. 16.

FIGS. 15 to 17 as yet another exemplary embodiment of the present invention illustrate a method in which a simultaneous transmit/receive terminal performs simultaneous transmission/reception of data by using an extended backoff counter.

FIG. 15 illustrates an exemplary embodiment of a data transmitting method using the extended backoff counter (alternatively, an extended backoff timer). In the exemplary embodiment of FIG. 15, the AP has downlink data DL_Data to the STA2 and the STA1 has uplink data UL_Data to the AP. Further, it is assumed that the STA1 and the STA2 have no interference relationship and the backoff counter of the AP is smallest in the corresponding BSS.

First, each terminal waits for an AIFS time after a transmission of previous data is completed (S1501). Each terminal having data to be transmitted performs the backoff procedure allocated to each terminal after the AIFS time. According to the exemplary embodiment of FIG. 15, the backoff procedure of the AP having the shortest backoff counter first ends. However, when at least one of an RTS frame and a CTS frame of another terminal is not received before the backoff counter of the corresponding terminal is expired, the AP which is the simultaneous transmit/receive terminal may perform an additional backoff procedure by using the extended backoff counter (S1502). The extended backoff counter which is used for increasing a probability that the simultaneous data transmission/reception will be performed may be allocated to the simultaneous transmit/receive terminal (AP) according to various exemplary embodiments.

According to an exemplary embodiment, the extended backoff counter may be determined based on a value obtained by multiplying a backoff counter value allocated to the simultaneous transmit/receive terminal (AP) by a predetermined proportional constant. In this case, the proportional constant may be set by various methods. For example, the proportional constant may be set based on the number of transmissions or a transmission time of uplink data of other terminals with respect to the simultaneous transmit/receive terminal (AP) during a predetermined interval before a current time. Alternatively, the proportional constant may be set based on a ratio of the number of transmissions (alternatively, a transmission time) of uplink data to the simultaneous transmit/receive terminal (AP) to the number of transmissions (alternatively, the transmission time) of downlink data of the simultaneous transmit/receive terminal (AP) during the interval. According to the exemplary embodiment of the present invention, as the number of transmissions or the transmission time of the uplink data to the simultaneous transmit/receive terminal (AP) during the predetermined interval increases, the proportional constant increases to allow the simultaneous transmit/receive terminal to wait for a longer time after a normal backoff procedure, thereby increasing a probability that simultaneous transmission/reception will be performed. On the contrary, as the number of transmissions or the transmission time of the uplink data during the predetermined interval decreases, the proportional constant decreases to reduce an unnecessary waiting time of the simultaneous transmit/receive terminal.

According to another exemplary embodiment of the present invention, a contention window (CW) for the simultaneous transmit/receive terminal (AP) may be set to a larger value than a normal contention window of another terminal in the same BSS. As described above, the backoff counter for the backoff procedure is determined as a random number value within a contention window (CW) range set for the corresponding terminal. Herein, the contention window (CW) of each terminal is determined as a value between a minimum contention window CW_min and a maximum contention window CW_max. That is, the contention window (CW) of each terminal is initialized to the minimum contention window CW_min and a terminal in which a collision occurs after the backoff procedure increases the contention window (CW) in a range within the maximum contention window CW_max (for example, increased to two times larger than the previous contention window). According to the exemplary embodiment of the present invention, when the initial value of the contention window for the simultaneous transmit/receive terminal (AP) is denoted by CW_min' and the initial value of the normal contention window of another terminal is denoted by CW_min, each initial value may satisfy the following equation.

$$CW\_min = \beta CW\_min' \qquad \text{[Equation 1]}$$

Where, $\beta<1$ is satisfied.

That is, according to the exemplary embodiment of the present invention, the initial value CW_min' of the contention window for the simultaneous transmit/receive terminal (AP) is set to be larger than the initial value CW_min of the normal contention window of another terminal to derive the simultaneous transmit/receive terminal to be allocated with a higher backoff counter, thereby increasing a simultaneous data transmission/reception probability. As described above, a value of β may be set based on the number of transmissions or the transmission time of the uplink data during the predetermined interval before the present time.

Meanwhile, according to the exemplary embodiment of FIG. 15, the backoff counter of the STA1 is expired before the extended backoff counter of the AP is expired, and as a result, the STA1 transmits an RTS frame to the AP (S1503). As such, when the AP receives the RTS frame having an address of the corresponding terminal as a receiver address before the extended backoff counter is expired, the AP suspends the backoff procedure and transmits an RTS' frame to the STA2 after a SIFS time (S1504). In this case, the RTS' frame represents that the terminal (AP) transmitting the corresponding frame is capable of performing simultaneous transmission/reception of data and a subsequent data transmitting procedure is similar to the aforementioned exemplary embodiments of the above drawings. When the RTS frame from another terminal is not received until the extended backoff counter is expired, the AP regards that there is no target terminal that will perform the simultaneous transmission/reception and transmits an RTS frame to the STA2.

Meanwhile, according to another exemplary embodiment of the present invention, the AP may receive an uplink data (UL_Data) transmission request frame (for example, an RTS frame) from a plurality of terminals until the extended backoff counter is expired. And then the AP may transmit a trigger frame (for example, an RTS' frame) indicating simultaneous transmissions of uplink data UL_Data to each terminal that transmits the uplink data (UL_Data) transmission request frame. In this case, the AP does not suspend the backoff procedure in spite of receiving the uplink data (UL_Data) transmission request frame from a specific terminal before the backoff counter is expired and may further receive the uplink data (UL_Data) transmission request frame of another terminal until the backoff counter is expired. A waiting time for receiving the uplink data (UL_Data) transmission request frame from a plurality of terminals may be implemented even by the backoff procedure using the extended backoff counter, but the present invention is not limited thereto and the AP may wait for receiving the uplink data (UL_Data) transmission request frame from at least one terminal for a predetermined separate waiting time (for example, a buffer status report waiting time).

FIG. 16 illustrates another exemplary embodiment of a data transmitting method using an extended backoff counter. In the exemplary embodiment of FIG. 16, duplicated description of a part which is the same as or corresponds to the exemplary embodiment of FIG. 15 will be omitted. However, in the exemplary embodiment of FIG. 13, the STA3 is the terminal of the target BSS of FIG. 7 and has the interference relationship with the STA1. Further, the AP has the downlink data DL_Data to the STA3 and the STA1 has the uplink data UL_Data to the AP.

In the exemplary embodiment of FIG. 16, steps S1601 and S1602 may be performed similarly to steps S1501 and S1502 of FIG. 15. Next, the backoff counter of the STA1 is expired before the extended backoff counter of the AP is expired and the STA1 transmits an RTS frame to the AP (S1601). Meanwhile, in the exemplary embodiment of FIG. 16, since the STA1 and the STA3 have the interference relationship with each other, the STA3 as well as the AP may also receive the RTS frame of the STA1.

The AP that receives the RTS frame from the STA1 before the extended backoff counter is expired suspends the backoff procedure and transmits an RTS frame to the STA3 after a SIFS time (S1604). In the exemplary embodiment of FIG. 16, since the AP gains a lead in a backoff contention with the STA1, the AP does not transmit a CTS frame for the RTS frame but transmits the RTS frame for transmitting the downlink data DL_Data to the STA3. Meanwhile, in the exemplary embodiment of FIG. 15, the AP transmits the RTS' frame notifying simultaneous data transmission/reception in response to reception of the RTS frame by the STA1, but in the exemplary embodiment of FIG. 16, since the STA1 has the interference relationship with the STA3, the AP may transmit not the RTS' frame but the RTS frame to notify that unidirectional transmission is performed.

According to another exemplary embodiment of the present invention, the AP that receives the RTS frame from the STA1 before the extended backoff counter is expired may transmit an RTS" frame to the STA3 after a SIFS time (S1604). The RTS" frame has a format of a basic RTS frame and may represent that the terminal (AP) that transmits the corresponding frame is not capable of performing simultaneous transmission/reception through a predetermined bit of a preamble. In this case, information representing that the simultaneous transmission/reception is unavailable may be included in a non-legacy preamble which may be decoded by a non-legacy terminal (e.g. an 802.11ax terminal) or expressed through a reserved bit of a VHT-SIG-A field.

The STA3 that receives the RTS frame or the RTS" frame from the AP transmits a CTS frame to the AP after a SIFS time (S1605). The AP receives the CTS frame from the STA3 and transmits the downlink data DL_Data to the STA3 after a SIFS time (S1607).

Meanwhile, the RTS frame or the RTS" frame transmitted by the AP may be received even by the STA1. The STA1 that receives the RTS frame or the RTS" frame from the AP identifies that the uplink data transmission to the AP is unavailable and maintains the previous backoff (S1606). In this case, the STA1 may identify that an RTS frame transmission of the corresponding terminal is not unsuccessful but the AP gains the lead in transmitting the data by the case where the corresponding terminal receives an RTS frame or an RTS" frame from the AP a SIFS time after transmitting the RTS frame. Therefore, the STA1 does not perform the existing retransmission process depending on the unsuccessful RTS frame transmission, that is, a process of increasing the contention window (CW) value and newly being allocated with a backoff counter within the increased contention window (CW). Still, the STA1 maintains the previous backoff counter value to have a transmission priority in the next backoff contention after both transmission of the downlink data DL_Data by the AP and transmission of the ACK frame by the STA3 are finished. As an exemplary embodiment, the STA1 maintains the expired backoff counter value (that is, the backoff counter=0) to have a highest transmission right when the channel becomes a next idle state. As another exemplary embodiment, the STA1 is allocated with a new random number value within the range of the contention window (CW) allocated at the previous time to resume the backoff procedure.

FIG. 17 illustrates a method for guaranteeing a transmission priority in a next backoff contention with respect to a terminal which fails to transmit data in the exemplary embodiment of FIG. 16. When the transmission of the downlink data DL_Data by the AP is completed and the STA3 transmits an ACK frame corresponding thereto, the AP receives the ACK frame (S1701). In this case, the STA may have the transmission priority in the next backoff contention after the ACK frame is transmitted.

First, according to the exemplary embodiment of FIG. 17(a), the STA1 may perform a predetermined minimum backoff procedure an AIFS time after the ACK frame is received and thereafter, transmit the RTS frame (S1702). According to an exemplary embodiment, the backoff counter used in the minimum backoff procedure may be set to a value of a minimum contention window CW_min or less. According to another exemplary embodiment of the present invention, a contention window CW' allocated to the STA1 may be set as follows for the minimum backoff procedure.

$$CW'=CW\_min'/R \qquad \text{[Equation 2]}$$

Where, R>1 is satisfied.

That is, the contention window CW' of the STA1 may be set to a value smaller than the minimum contention window CW_min. The STA1 is allocated with a random number value within the set contention window CW' and uses the allocated random number value as the backoff counter to secure the priority of the data transmission.

Meanwhile, according to the exemplary embodiment of FIG. 17(b), the STA1 may immediately transmit the RTS frame a SIFS time after the ACK frame is received (S1703). That is, the STA1 may hold the highest priority in the data transmission by transmitting the RTS frame after the SIFS time without performing a separate backoff procedure after the ACK frame of the previous data transmission is received.

Figure 18:
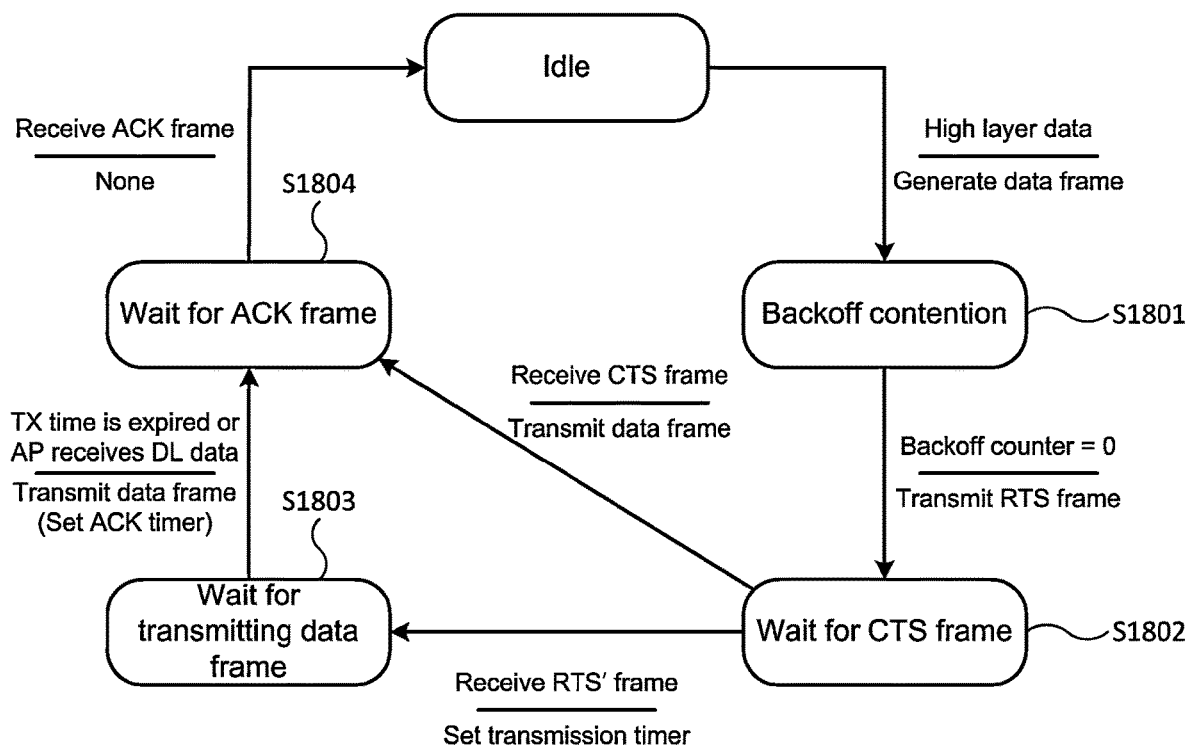
FIG. 18 is a state transition diagram of a target terminal of simultaneous transmission/reception according to the exemplary embodiment of the present invention.
Figure 19:
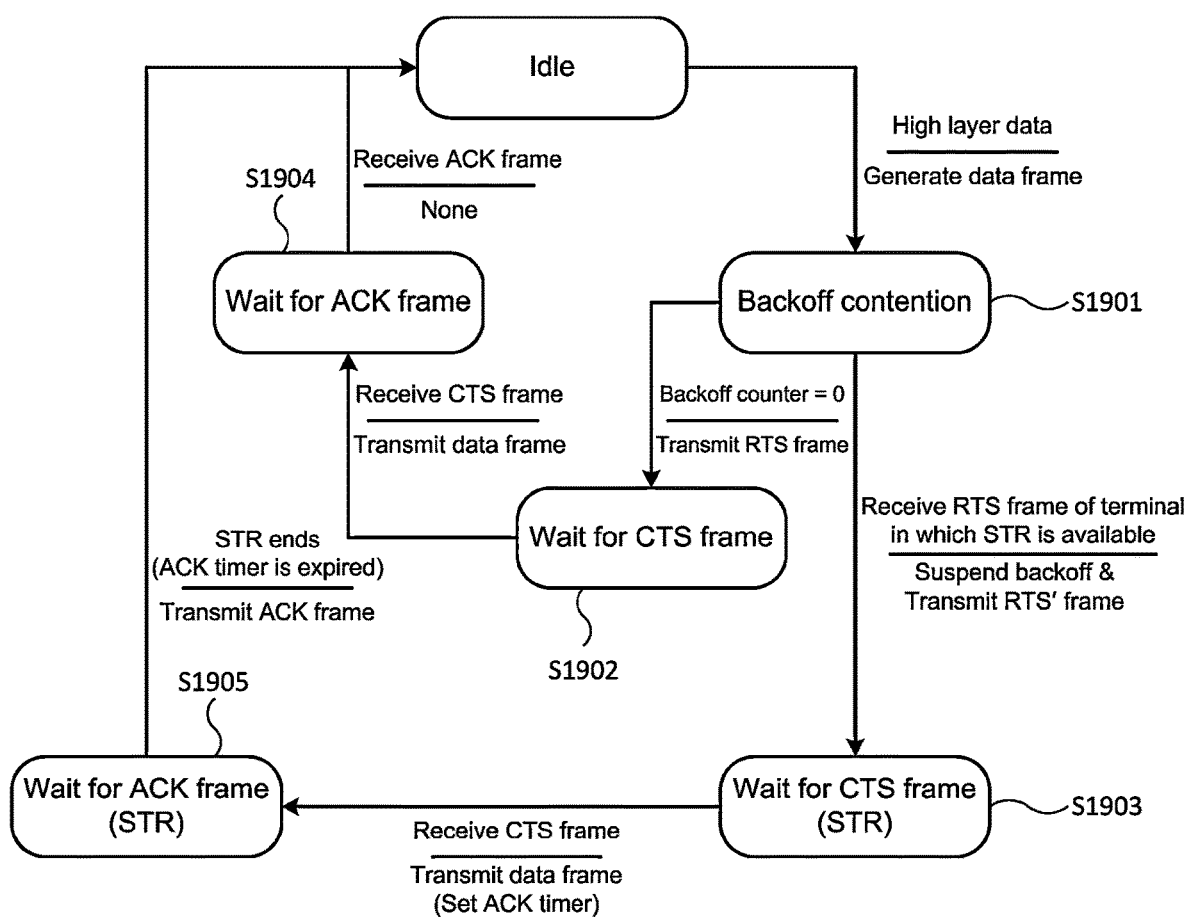
FIG. 19 is a state transition diagram of a simultaneous transmit/receive terminal according to the exemplary embodiment of the present invention.

FIGS. 18 and 19 illustrate state transitions of a target terminal of simultaneous transmission/reception and a simultaneous transmit/receive terminal according to the aforementioned exemplary embodiment. In the exemplary embodiment of FIGS. 18 and 19, each process of the target terminal of simultaneous transmission/reception may be performed by the non-AP STA of FIG. 3 and each process of the simultaneous transmit/receive terminal may be performed by the AP of FIG. 4. However, the present invention is not limited thereto and the exemplary embodiments of FIGS. 18 and 19 may be performed by at least one terminal of the non-AP STA and the AP. Further, the present invention may be applied to various types of wireless communication terminals as well as the wireless LAN communication terminal.

FIG. 18 illustrates the state transition of the target terminal (hereinafter, referred to as a first target terminal) of simultaneous transmission/reception according to the exemplary embodiment of the present invention. First, the first target terminal generates a data frame when high layer data to be transmitted is generated in the idle state. When the data frame is generated, the first target terminal is transitioned to a backoff contention state (S1801). The first target terminal performs the backoff procedure when the channel is idle in the backoff contention state, and when the predetermined backoff counter is expired (that is, the backoff counter=0), the first target terminal transmits the RTS frame. When the RTS frame is transmitted, the first target terminal is transitioned to a CTS frame stand-by state (S1802). When the CTS frame is received in step S1802, the first target terminal transmits the data frame. When the transmission of the data frame is completed, the first target terminal is transitioned to an ACK frame stand-by state (S1804).

Meanwhile, when the RTS' frame is received in step S1802, the first target terminal may identify that simultaneous data transmission/reception is performed and sets the transmission timer as described in the exemplary embodiment. The first target terminal waits for transmitting the data frame based on the set transmission timer (S1803). When the set transmission timer is expired or the downlink data of the simultaneous transmit/receive terminal (AP) is received, the target terminal transmits the data frame to the simultaneous transmit/receive terminal. Next, when the transmission of the data frame to the simultaneous transmit/receive terminal is completed, the first target terminal is transitioned to the ACK frame stand-by state (S1804). As described above, when the duration of the uplink data to be transmitted by the first target terminal is shorter than the duration of the downlink data to be transmitted by the simultaneous transmit/receive terminal, the ACK timer may be additionally set for the first target terminal. In this case, the ACK timer may be set based on the duration field of the RTS' frame. When an ACK frame is received in the ACK frame stand-by state, the first target terminal is transitioned to the idle state again.

FIG. 19 illustrates a state transition of a simultaneous transmit/receive terminal according to the exemplary embodiment of the present invention. In the exemplary embodiment of FIG. 19, it is assumed that the simultaneous transmit/receive terminal has data to be transmitted to not the first target terminal of FIG. 18 but a second target terminal.

First, the simultaneous transmit/receive terminal generates data frame when high layer data to be transmitted is generated in the idle state. When the data frame is generated, the simultaneous transmit/receive terminal is transitioned to the backoff contention state (S1901). The simultaneous transmit/receive terminal performs the backoff procedure when the channel is idle in the backoff contention state, and when the predetermined backoff counter is expired (that is, the backoff counter=0), the simultaneous transmit/receive terminal transmits the RTS frame to the second target terminal. When the RTS frame is transmitted, the simultaneous transmit/receive terminal is transitioned to the CTS frame stand-by state (S1902). When the CTS frame from the second target terminal is received in step S1902, the simultaneous transmit/receive terminal transmits the data frame to the second target terminal. After the simultaneous transmit/receive terminal transmits the data frame completely, the simultaneous transmit/receive terminal is transitioned to the ACK frame stand-by state (S1904). When an ACK frame from the second terminal is received in the ACK frame stand-by state, the simultaneous transmit/receive terminal is transitioned to the idle state again.

Meanwhile, when the RTS frame of the first target terminal in which the simultaneous data transmission/reception is available is received in step S1901, the simultaneous transmit/receive terminal suspends the backoff procedure and transmits the RTS' frame to the second target terminal. When the simultaneous transmit/receive terminal transmits the RTS frame, the simultaneous transmit/receive terminal is transitioned to the CTS frame stand-by state of a simultaneous transmit/receive (STR) mode (S1903). When the CTS frame from the second target terminal is received in step S1903, the simultaneous transmit/receive terminal transmits the data frame to the second target terminal. Meanwhile, in the simultaneous transmit/receive mode, the simultaneous transmit/receive terminal may transmit the data frame to the second target terminal and receive the data frame from the first target terminal. When the transmission of the data frame to the second target terminal is completed, the simultaneous transmit/receive terminal is transitioned to the ACK frame stand-by state of the simultaneous transmit/receive (STR) mode (S1905). According to the exemplary embodiment, the ACK timer for waiting for receiving an ACK frame from the second target terminal or transmitting an ACK frame to the first target terminal may be set for the simultaneous transmit/receive terminal. When a simultaneous transmission/reception condition is finished or the ACK timer is expired in the ACK frame stand-by state, the simultaneous transmit/receive terminal transmits an ACK frame to the first target terminal. Meanwhile, in the simultaneous transmit/receive mode, the simultaneous transmit/receive terminal may transmit an ACK frame to the first target terminal and receive an ACK frame from the second target terminal simultaneously. When the transmission and reception of the ACK frame are completed, the simultaneous transmit/receive terminal is transitioned to the idle state.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICS s), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal comprising:
a transceiver; and
a processor,
wherein the processor is configured to:
receive a trigger frame indicating simultaneous transmissions of one or more terminals in a basic service set (BSS) from an access point (AP),
wherein the trigger frame includes a length subfield for determining a length of an uplink frame transmitted in response to the trigger frame,
transmit the uplink frame in response to the trigger frame, and
receive an acknowledgement frame in response to the uplink frame,
wherein a first duration of the uplink frame is adjusted based on the length indicated by the length subfield of the trigger frame and a second duration of a data included in the uplink frame, and
wherein the acknowledgement frame is transmitted at a time determined according to the adjusted first duration for the transmission of the uplink frame.

2. The wireless communication terminal of claim 1, wherein the trigger frame is used to soliciting the one or more terminals to simultaneously transmit one or more uplink frame in response to the trigger frame.

3. The wireless communication terminal of claim 1, wherein a specific parameter used to adjust the first duration is set to the length indicated by the length subfield.

4. The wireless communication terminal of claim 1, wherein the uplink frame is transmitted at a same time as one or more uplink frame transmitted by the one or more terminals in response to the trigger frame.

5. The wireless communication terminal of claim 1, wherein the trigger frame includes predetermined bits indicating the one or more terminals that transmit one or more uplink frame in response to the trigger frame.

6. A wireless communication method of a terminal, the method comprising:
receiving a trigger frame indicating simultaneous transmissions of one or more terminals in a basic service set (BSS) from an access point (AP),
wherein the trigger frame includes a length subfield for determining a length of an uplink frame transmitted in response to the trigger frame;
transmit the uplink frame in response to the trigger frame; and
receiving an acknowledgement frame in response to the uplink frame, wherein a first duration of the uplink frame is adjusted based on the length indicated by the length subfield of the trigger frame and a second duration of a data included in the uplink frame, and wherein the acknowledgement frame is transmitted at a time determined according to the adjusted first duration for the transmission of the uplink frame.

7. The wireless communication method of claim 6, wherein the trigger frame is used to soliciting the one or more terminals to simultaneously transmit one or more uplink frame in response to the trigger frame.

8. The wireless communication method of claim 6, wherein a specific parameter used to adjust the first duration is set to the length indicated by the length subfield.

9. The wireless communication method of claim 6, wherein the uplink frame is transmitted at a same time as one or more uplink frame transmitted by the one or more terminals in response to the trigger frame.

10. The wireless communication method of claim 6, wherein the trigger frame includes predetermined bits indicating the one or more terminals that transmit one or more uplink frame in response to the trigger frame.

* * * * *